(12) United States Patent
Horiuchi

(10) Patent No.: US 6,751,028 B1
(45) Date of Patent: Jun. 15, 2004

(54) ZOOM LENS AND OPTICAL APPARATUS USING THE SAME

(75) Inventor: Akihisa Horiuchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/698,115

(22) Filed: Oct. 30, 2000

Related U.S. Application Data

(62) Division of application No. 09/263,230, filed on Mar. 5, 1999, now Pat. No. 6,166,864.

(30) Foreign Application Priority Data

| Mar. 10, 1998 | (JP) | 10-058034 |
| Apr. 23, 1998 | (JP) | 10-129524 |

(51) Int. Cl.[7] .............................. G02B 15/14; G02B 9/34

(52) U.S. Cl. ................... 359/687; 359/676; 359/683; 359/686; 359/774; 359/772

(58) Field of Search .................. 359/687, 683, 359/684, 676, 686, 774, 772, 771, 769

(56) References Cited

U.S. PATENT DOCUMENTS

| 4,299,454 A | 11/1981 | Betensky | 350/427 |
| 4,659,188 A | * 4/1987 | Kreitzer | 359/687 |
| 4,776,679 A | 10/1988 | Kitagishi et al. | 350/427 |
| 4,802,747 A | 2/1989 | Horiuchi | 350/427 |
| 4,810,070 A | 3/1989 | Suda et al. | 350/413 |
| RE32,923 E | 5/1989 | Kreitzer | 350/433 |
| 4,842,386 A | 6/1989 | Kitagishi et al. | 350/427 |
| 4,854,684 A | 8/1989 | Horiuchi | 350/427 |
| 4,859,042 A | 8/1989 | Tanaka | 350/423 |
| 4,892,397 A | 1/1990 | Horiuchi | 350/425 |
| 4,907,866 A | 3/1990 | Kitagishi et al. | 350/427 |
| 4,934,796 A | 6/1990 | Sugiura et al. | 350/427 |
| 4,988,174 A | 1/1991 | Horiuchi et al. | 350/427 |
| 5,011,272 A | 4/1991 | Nakayama et al. | 350/427 |
| 5,050,972 A | 9/1991 | Mukaiya et al. | 359/683 |
| 5,056,900 A | 10/1991 | Mukaiya et al. | 359/676 |
| 5,138,492 A | 8/1992 | Hamano et al. | 359/684 |
| 5,225,937 A | 7/1993 | Horiuchi | 359/688 |
| 5,321,552 A | 6/1994 | Horiuchi et al. | 359/654 |
| 5,353,157 A | 10/1994 | Horiuchi | 359/676 |
| 5,612,825 A | 3/1997 | Horiuchi | 359/687 |
| 5,638,216 A | 6/1997 | Horiuchi et al. | 359/683 |

(List continued on next page.)

FOREIGN PATENT DOCUMENTS

| JP | 62-24213 | 2/1987 |
| JP | 63-29718 | 2/1988 |
| JP | 63-44614 | 2/1988 |
| JP | 63-247316 | 10/1988 |
| JP | 63-278013 | 11/1988 |
| JP | 5-60974 | 3/1993 |
| JP | 5-72472 | 3/1993 |
| JP | 7-270684 | 10/1995 |
| JP | 7-318804 | 12/1995 |
| JP | 9-281390 | 10/1997 |
| JP | 9-281391 | 10/1997 |
| JP | 9-304698 | 11/1997 |

*Primary Examiner*—Georgia Epps
*Assistant Examiner*—Timothy Thompson
(74) *Attorney, Agent, or Firm*—Fitzpatrick, Cella, Harper & Scinto

(57) ABSTRACT

A zoom lens includes, in order from an object side to an image side, a first lens unit of positive refractive power, a second lens unit of negative refractive power, a third lens unit of positive refractive power and a fourth lens unit of positive refractive power, zooming from a wide-angle end to a telephoto end being effected by moving the second lens unit toward the image side, and shifting of an image plane due to zooming being compensated for by moving the fourth lens unit, wherein the second lens unit consists of four separate single lenses including three negative lenses and one positive lens, and the third lens unit has at least one positive lens both surfaces of which are aspherical.

33 Claims, 13 Drawing Sheets

U.S. PATENT DOCUMENTS

| | | | |
|---|---|---|---|
| 5,671,062 A | * 9/1997 | Nakamura | 359/687 |
| 5,719,708 A | 2/1998 | Nagaoka | 359/687 |
| 5,739,961 A | 4/1998 | Nakayama et al. | 359/687 |
| 5,754,346 A | 5/1998 | Nakayama et al. | 359/687 |
| 5,798,872 A | * 8/1998 | Uzawa | 359/686 |
| 5,808,808 A | * 9/1998 | Yamanashi | 359/682 |
| 5,963,378 A | * 10/1999 | Tochigi et al. | 359/687 |
| 6,010,537 A | * 1/2000 | Konno et al. | 659/389 |
| 6,016,228 A | * 1/2000 | Uzawa | 359/687 |
| 6,081,389 A | 6/2000 | Takayama et al. | 359/680 |
| 6,084,722 A | 7/2000 | Horiuchi | 359/687 |
| 6,166,864 A | * 12/2000 | Horiuchi | 359/687 |
| 6,226,130 B1 | * 5/2001 | Mukaiya et al. | 359/687 |

* cited by examiner

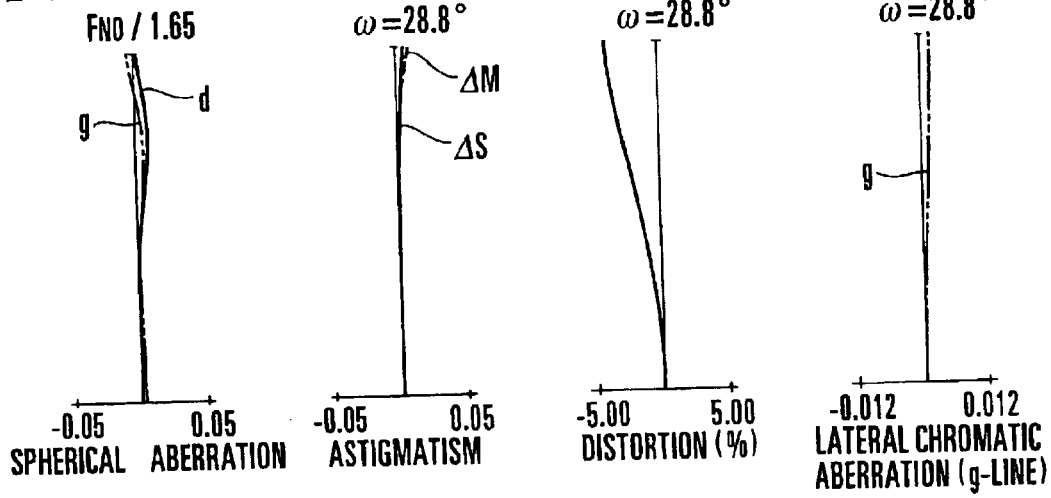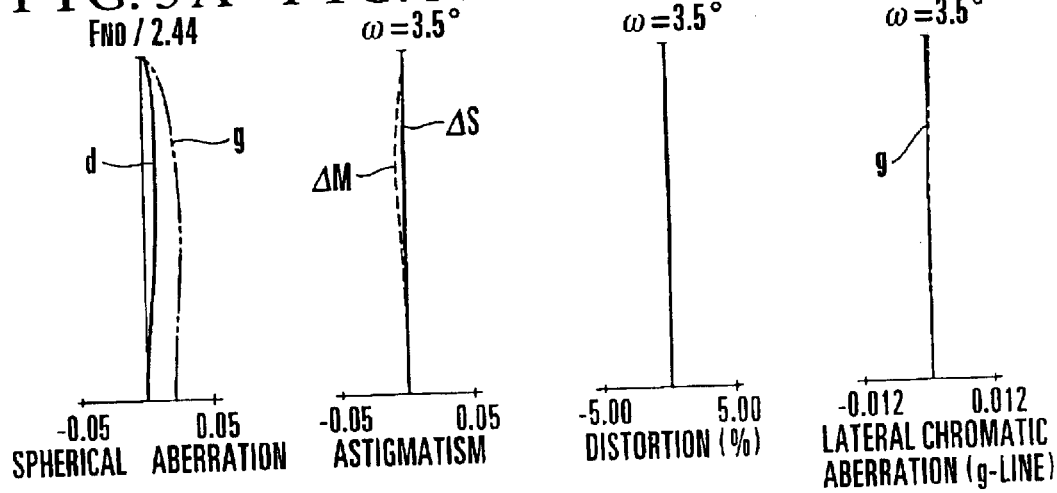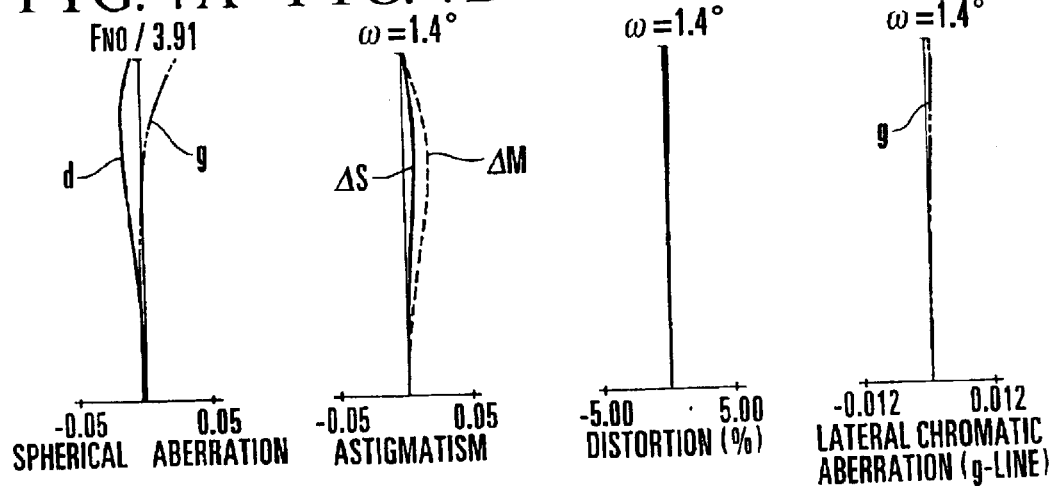

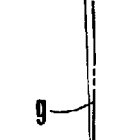

F<sub>NO</sub> / 1.85
-0.05  0.05
SPHERICAL ABERRATION

ω = 28.8°
-0.05  0.05
ASTIGMATISM

ω = 28.8°
-5.00  5.00
DISTORTION (%)

ω = 28.8°
-0.012  0.012
LATERAL CHROMATIC ABERRATION (g-LINE)

F<sub>NO</sub> / 2.65
-0.05  0.05
SPHERICAL ABERRATION

ω = 3.7°
-0.05  0.05
ASTIGMATISM

ω = 3.7°
-5.00  5.00
DISTORTION (%)

ω = 3.7°
-0.012  0.012
LATERAL CHROMATIC ABERRATION (g-LINE)

F<sub>NO</sub> / 3.52
-0.05  0.05
SPHERICAL ABERRATION

ω = 1.6°
-0.05  0.05
ASTIGMATISM

ω = 1.6°
-5.00  5.00
DISTORTION (%)

ω = 1.6°
-0.012  0.012
LATERAL CHROMATIC ABERRATION (g-LINE)

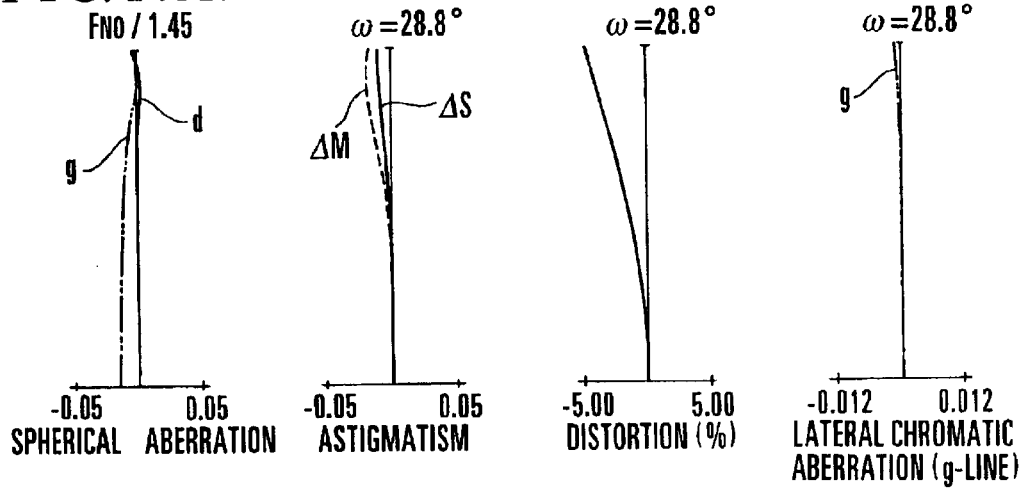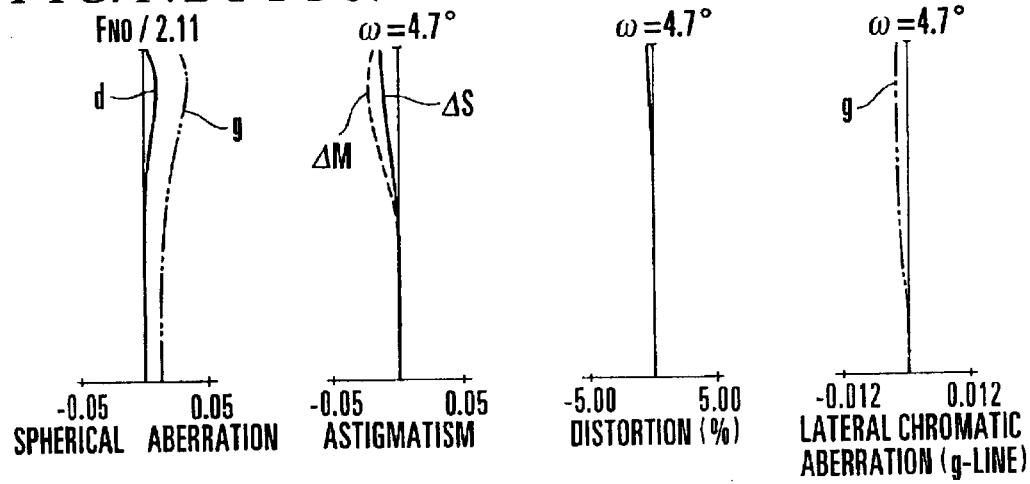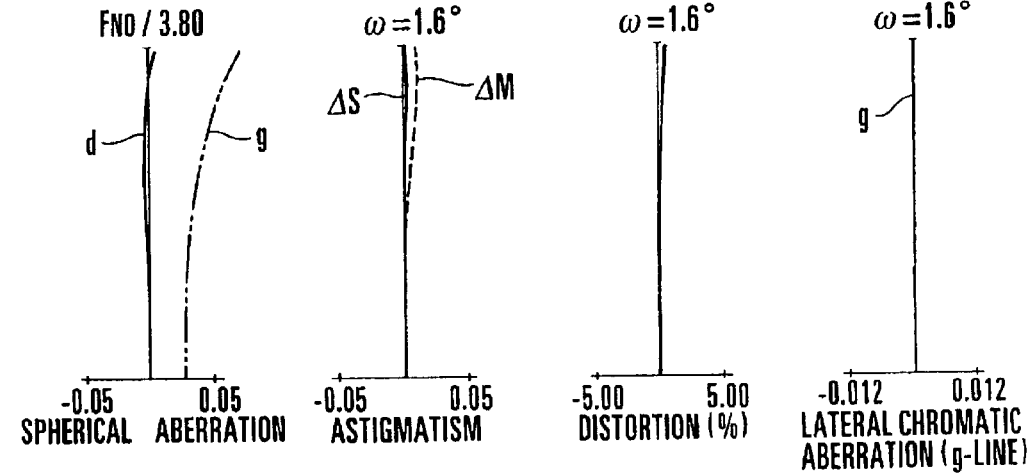

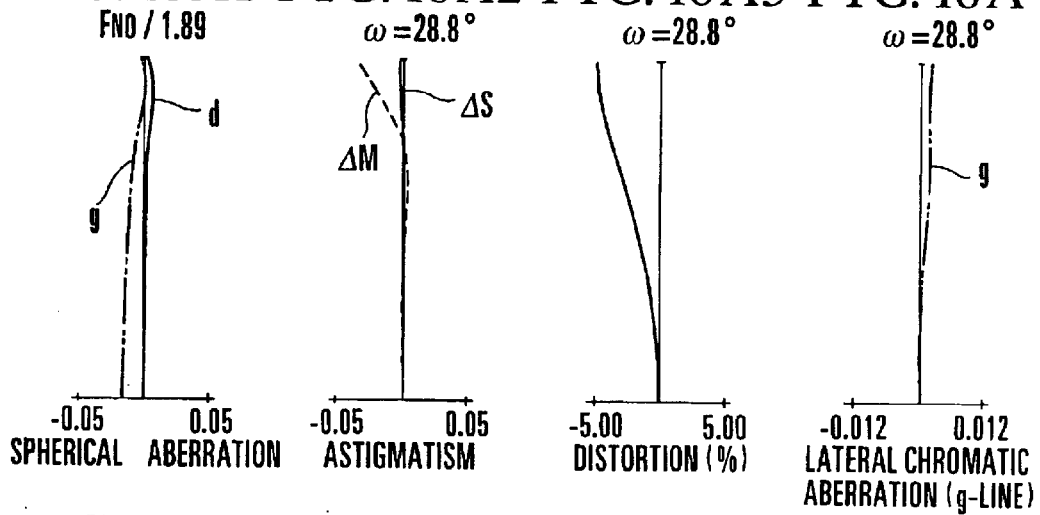
FIG. 16A1  FIG. 16A2  FIG. 16A3  FIG. 16A4
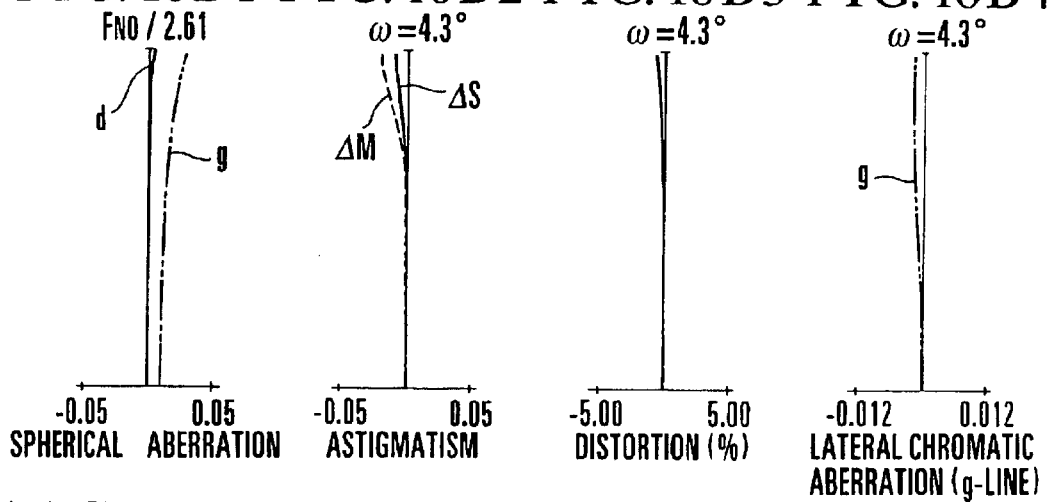
FIG. 16B1  FIG. 16B2  FIG. 16B3  FIG. 16B4
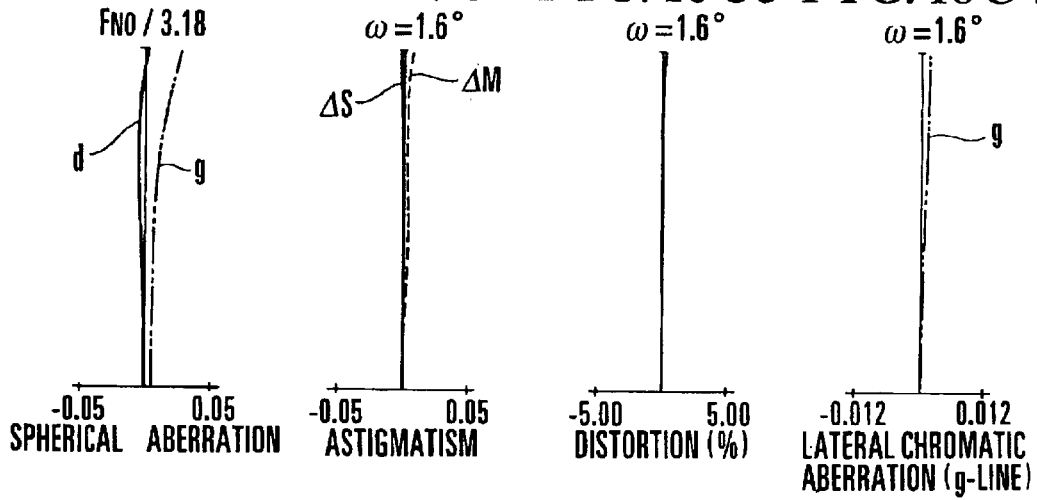
FIG. 16C1  FIG. 16C2  FIG. 16C3  FIG. 16C4

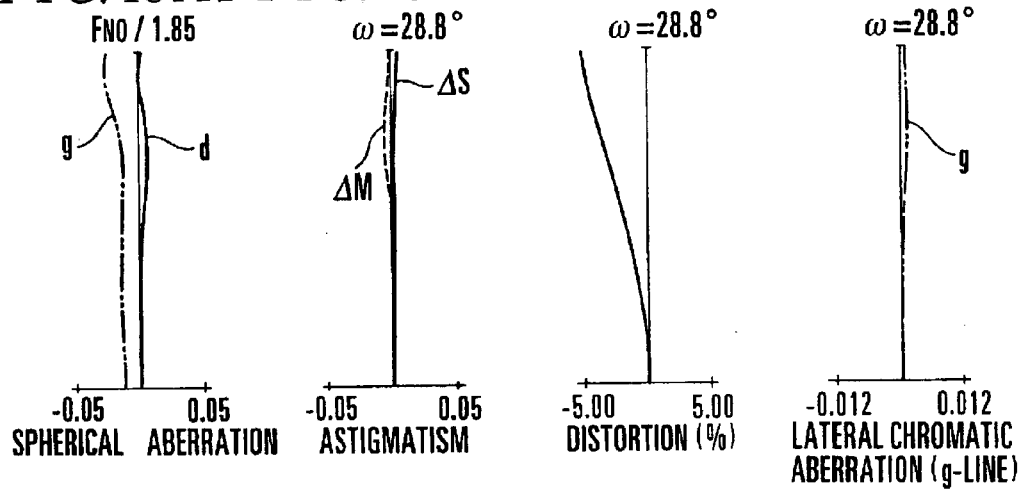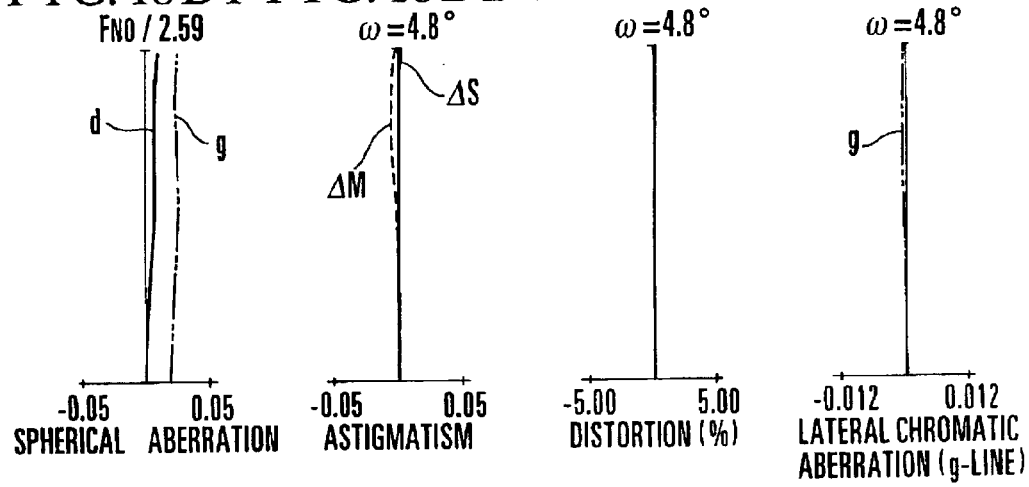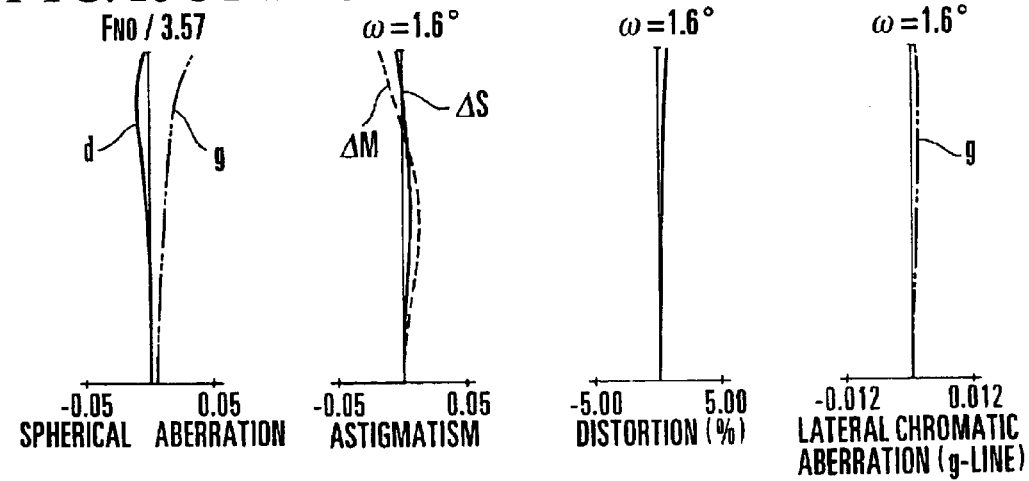

ZOOM LENS AND OPTICAL APPARATUS USING THE SAME

This application is a division of application Ser. No. 09/263,230 filed Mar. 5, 1999 now U.S. Pat. No. 6,166,864.

BACKGROUND OF THE INVENTION

1. Field of the Invention

The present invention relates to a zoom lens and an optical apparatus using the same and, more particularly, to a zoom lens utilizing the rear-focus method and having a high range with a relatively small number of constituent lenses, suited to be used in video cameras, film cameras and broadcasting cameras, and an optical apparatus using the same.

2. Description of Related Art

For a zoom lens to be used in a photographic camera, a video camera or like optical apparatus, the use of a lens unit other than the front or first lens unit in focusing, or the so-called "rear-focus" method, has been previously proposed in many examples. This is because the rear-focus method admits a lens unit of relatively small size and light weight to move during focusing. Therefore, the driving torque can be weak and, nonetheless, fast focus adjustment can be effected, so that the rear-focus method has an advantage for good adaptation to the auto-focus system.

Such a rear-focus type of zoom lens is disclosed in, for example, Japanese laid-Open Patent Application No. Sho 63-44614, which comprises, in order from an object side, a first lens unit of positive refractive power, a second lens unit of negative refractive power axially movable for varying the focal length, a third lens unit of negative refractive power axially movable for compensating for the shift of the image plane with a variation of the focal length and a fourth lens unit of positive refractive power, totaling four lens units. In this so-called "4-unit" zoom lens, the third lens unit is made movable to effect focusing. However, such an arrangement must assure creation of a large space in which to move the third lens unit. So, the total length of the entire lens system tends to increase greatly.

Japanese Laid-Open Patent Application No. Sho 63-278013, too, discloses a 4-unit zoom lens comprising a first lens unit of positive refractive power, a second lens unit of negative refractive power, a third lens unit of negative refractive power and a fourth lens unit of positive refractive power, wherein zooming is performed by the second lens unit and compensation for the image shift and focusing are performed by the fourth lens unit. In the zoom lens configuration that has made the third lens unit negative in refractive power, however, because the diverging rays of light from the second lens unit are further diverged by the third lens unit, the diameter of the fourth lens unit becomes larger, causing the increasing the bulk and size of the entire lens system. Moreover, the range of variation of aberrations due to focusing tends to ever more widen.

On the other hand, Japanese Laid-Open Patent Applications No. Sho 62-24213 (corresponding to U.S. Pat. No. 4,859,042) and No. Sho 63-247316 propose a zoom lens comprising, in order from an object side, a first lens unit of positive refractive power, a second lens unit of negative refractive power, a third lens unit of positive refractive power and a fourth lens unit of positive refractive power, totaling four lens units, wherein the second lens unit moves to effect zooming and the fourth lens unit moves to compensate for the image shift with zooming and to effect focusing. Such an arrangement assures minimization of the bulk and size of the entire lens system.

Japanese Laid-Open Patent Application No. Sho 63-29718 discloses a zoom lens comprising, in order from an object side, a first lens unit of positive refractive power, a second lens unit which is constructed with a negative lens, a negative lens and a positive lens, totaling three lenses, whose overall refractive power is negative and which, during zooming, is movable as mainly governing the variation of the focal length, a third lens unit having a positive refractive power and containing an aspheric surface and, after a bit large air separation, a fourth lens unit having a positive refractive power and movable for compensating for the image shift with zooming and for focusing.

Japanese Laid-Open Patent Application No. Hei 5-72472 discloses a zoom lens, using aspheric surfaces, which comprises, in order from an object side, a first lens unit having a positive refractive power and stationary during zooming and focusing, a second lens unit having a negative refractive power and movable for zooming, a third lens unit of positive refractive power fixed and having a light condensing action and a fourth lens unit of positive refractive power axially movable for keeping the constant position of the image plane against zooming, wherein the second lens unit is constructed with a negative lens of meniscus form, a negative lens of bi-concave form and a positive lens, the third lens unit is constructed with a single lens having one or more aspheric surfaces, and the fourth lens unit is constructed with lenses having one or more aspheric surfaces.

In the above-mentioned references, however, there is not disclosed any zoom lens in which the second lens unit is constructed with four lenses. Further, there is not disclosed any arrangement in which an aspheric surface is contained in the second lens unit.

Meanwhile, U.S. Pat. No. 4,299,454 discloses a zoom lens comprising, in order from an object side, a positive first lens unit, a negative second lens unit and a positive rear lens unit, wherein zooming is performed by moving at least two lens units including the negative second lens unit. The negative second lens unit is constructed with, in order from the object side, first and second negative lenses and a positive doublet. However, because the third lens unit is movable, the mechanism therefor results in an increased complexity of structure. U.S. Reissue Pat. No. 32,923 discloses a zoom lens comprising, inorder from an object side, a positive first lens unit, a negative second lens unit, a stop, a positive third lens unit and a positive fourth lens unit. The first and fourth lens units are arranged during zooming to move in the same direction, and the stop remains stationary during zooming. Further, the second lens unit contains one cemented lens.

In the two U.S. Patents mentioned above, however, there are no examples suggesting that the third lens unit is constructed with inclusion of a double-aspherical lens and also that any aspheric surface is used in the second lens unit.

Japanese Laid-Open Patent Applications No. Hei 7-270684 and No. Hei 7-318804 disclose a zoom lens comprising, in order from an object side, a first lens unit having a positive refractive power and being fixed, a second lens unit having a negative refractive power and axially movable for varying the focal length, a third lens unit having a positive refractive power and being fixed and a fourth lens unit of positive refractive power axially movable for keeping the constant position of the image plane against zooming and for focusing, wherein the second lens unit is constructed with four single lenses. However, there are disclosed no zoom lenses having a double-aspherical lens in the third lens unit.

Japanese Laid-Open Patent Applications No. Hei 5-060974 discloses a zoom lens comprising, in order from an object side, a first lens unit having a positive refractive power and being fixed, a second lens unit having a negative refractive power and axially movable for varying the focal length, a third lens unit having a positive refractive power and being fixed and a fourth lens unit of positive refractive power axially movable for keeping the constant position of the image plane against zooming and for focusing, wherein the total length of the entire lens system is shortened. However, there are disclosed no zoom lenses both with the use of four single lenses in the second lens unit and with a double-aspherical lens in the third lens unit.

BRIEF SUMMARY OF THE INVENTION

The present invention is concerned with an unconventional or novel zoom lens configuration which improves the compact form of the entire lens system. An object of the invention is, therefore, to provide a zoom lens of high range, while still permitting the high optical performance to be maintained stable throughout and, moreover, the number of constituent lenses to be reduced so that it takes a simple form, and an optical apparatus using the same.

To attain the above-described object, in accordance with a first aspect of the invention, there is provided a zoom lens which comprises, in order from an object side to an image side, a first lens unit of positive refractive power, a second lens unit of negative refractive power, a third lens unit of positive refractive power and a fourth lens unit of positive refractive power. Zooming from a wide-angle end to a telephoto end is effected by moving the second lens unit toward the image side, and shifting of an image plane due to zooming being compensated for by moving the fourth lens unit, wherein the second lens unit consists of four separate single lenses including three negative lenses and one positive lens, and the third lens unit has at least one positive lens both surfaces of which are aspherical.

Further, in accordance with a second aspect of the invention, there is provided a zoom lens which comprises, in order from an object side to an image side, a first lens unit of positive refractive power, a second lens unit of negative refractive power, a third lens unit of positive refractive power and a fourth lens unit of positive refractive power. Zooming from a wide-angle end to a telephoto end is effected by moving the second lens unit toward the image side, and shifting of an image plane due to zooming being compensated for by moving the fourth lens unit, wherein the second lens unit consists of four single lenses including three negative lenses and one positive lens, and at least one of the four single lenses is an aspherical lens.

Further, in accordance with a third aspect of the invention, there is provided an optical apparatus which comprises a zoom lens according to the first or second aspect of the invention.

The above and further aspects and features of the invention will become apparent from the following detailed description of preferred embodiments thereof taken in conjunction with the accompanying drawings.

BRIEF DESCRIPTION OF THE SEVERAL VIEWS OF THE DRAWING

FIGS. 2A to 2D are graphic representations of the aberrations of the zoom lens of numerical example 1 in the wide-angle end.

FIGS. 3A to 3D are graphic representations of the aberrations of the zoom lens of numerical example 1 in a middle focal-length position.

FIGS. 4A to 4D are graphic representations of the aberrations of the zoom lens of numerical example 1 in the telephoto end.

FIGS. 6A to 6D are graphic representations of the aberrations of the zoom lens of numerical example 2 in the wide-angle end.

FIGS. 7A to 7D are graphic representations of the aberrations of the zoom lens of numerical example 2 in a middle focal-length position.

FIGS. 8A to 8D are graphic representations of the aberrations of the zoom lens of numerical example 2 in the telephoto end.

FIGS. 14A1 to 14A4, 14B1 to 14B4 and 14C1 to 14C4 are graphic representations of the aberrations of the zoom lens of numerical example 4 in three different operative positions.

FIGS. 16A1 to 16A4, 16B1 to 16B4 and 16C1 to 16C4 are graphic representations of the aberrations of the zoom lens of numerical example 5 in three different operative positions.

FIGS. 18A1 to 18A4, 18B1 to 18B4 and 18C1 to 18C4 are graphic representations of the aberrations of the zoom lens of numerical example 6 in three different operative positions.

DETAILED DESCRIPTION OF THE INVENTION

Hereinafter, preferred embodiments of the invention will be described in detail with reference to the drawings.

Figure 1:
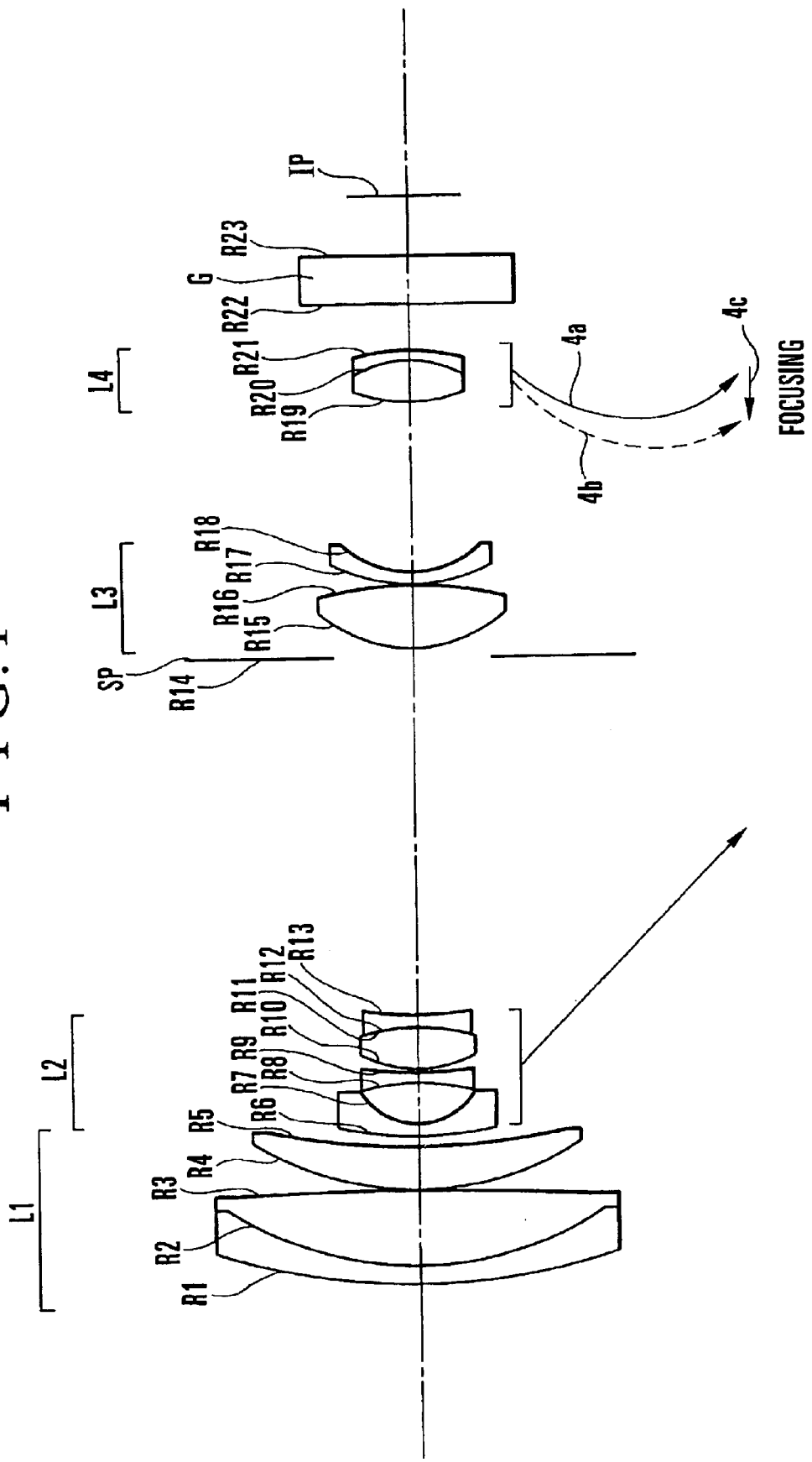
FIG. 1 is a longitudinal section view of a numerical example 1 of the zoom lens.

FIG. 1 in block diagram shows a numerical example 1 of the rear-focus type zoom lens according to a first embodiment of the invention. FIGS. 2A to 2D, FIGS. 3A to 3D and FIGS. 4A to 4D graphically show the aberrations of the zoom lens of numerical example 1 at the wide-angle end, at the middle focal length position and at the telephoto end, respectively.

Figure 5:
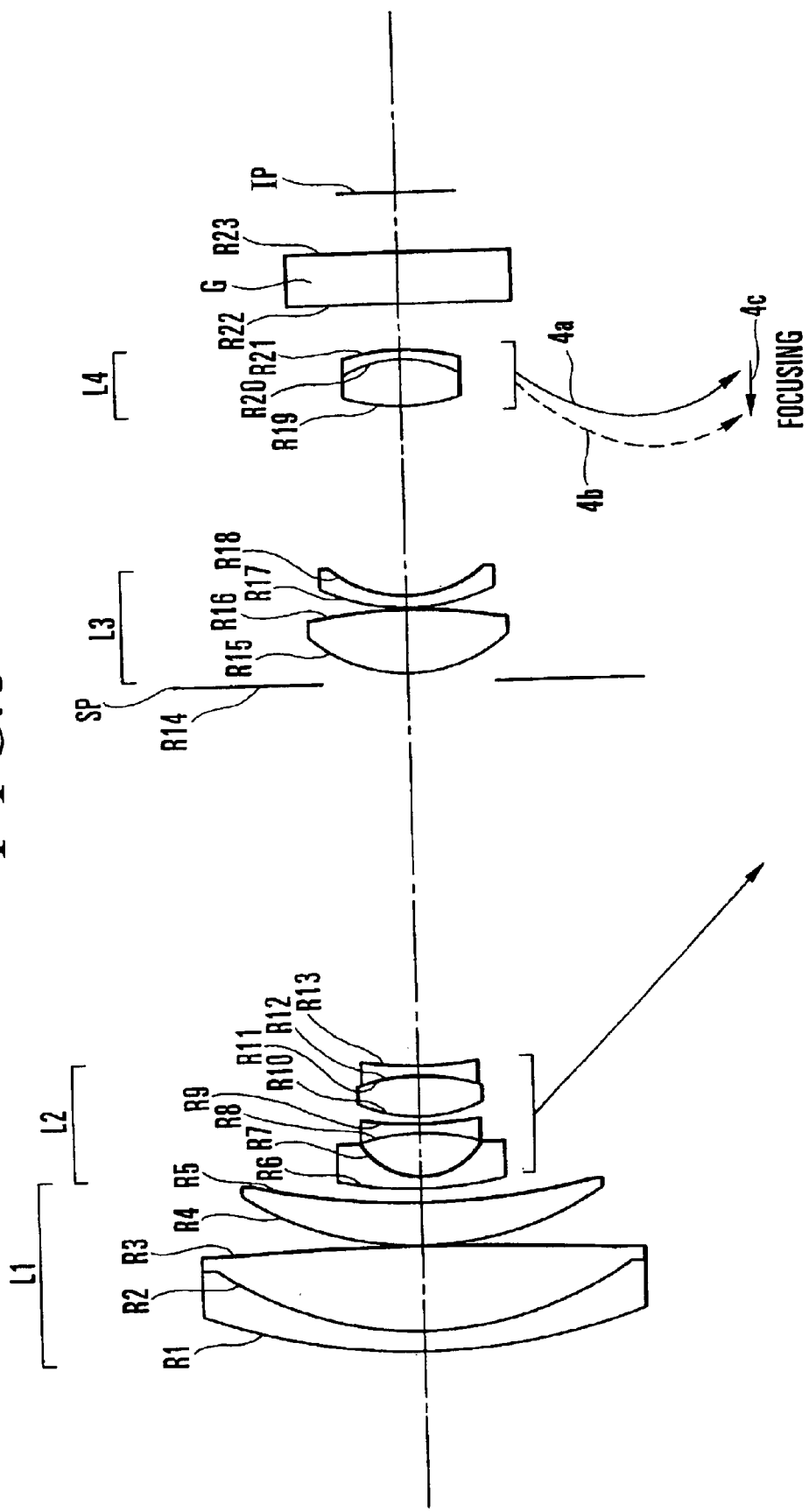
FIG. 5 is a longitudinal section view of a numerical example 2 of the zoom lens.

FIG. 5 in block diagram shows a numerical example 2 of the rear-focus type zoom lens according to the first embodiment of the invention. FIGS. 6A to 6D, FIGS. 7A to 7D and FIGS. 8A to 8D graphically show the aberrations of the zoom lens of numerical example 2 at the wide-angle end, at the middle focal length position and at the telephoto end, respectively.

Figure 9:
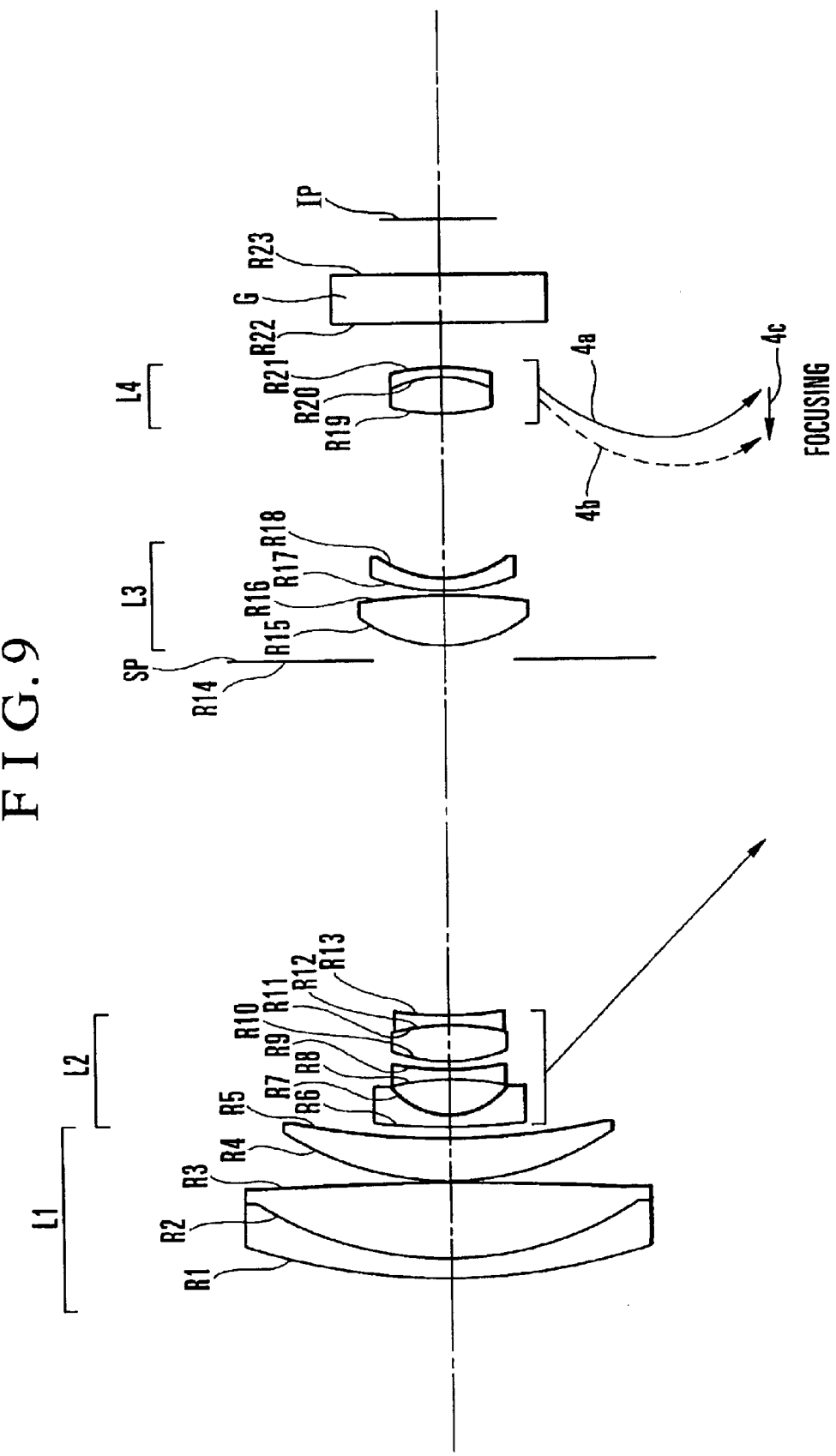
FIG. 9 is a longitudinal section view of a numerical example 3 of the zoom lens.
Figure 10A:
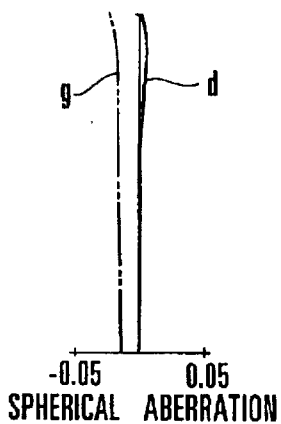
FIGS. 10A to 10D are graphic representations of the aberrations of the zoom lens of numerical example 3 in the wide-angle end.
Figure 10B:
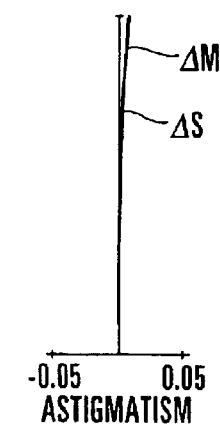
Figure 10C:
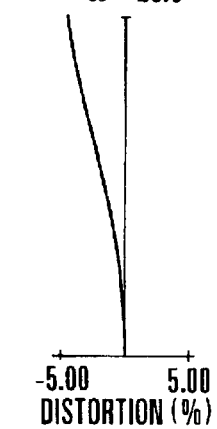
Figure 10D:
Figure 11A:
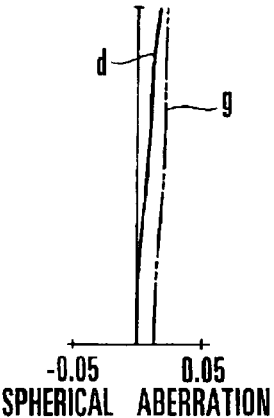
FIGS. 11A to 11D are graphic representations of the aberrations of the zoom lens of numerical example 3 in a middle focal-length position.
Figure 11B:
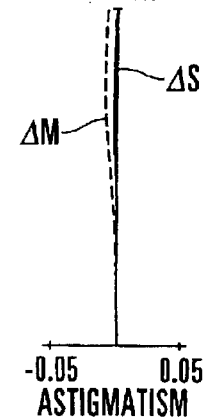
Figure 11C:
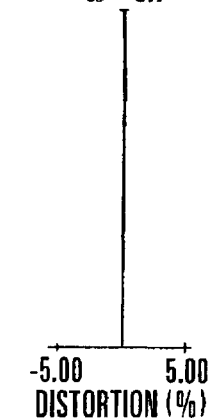
Figure 11D:
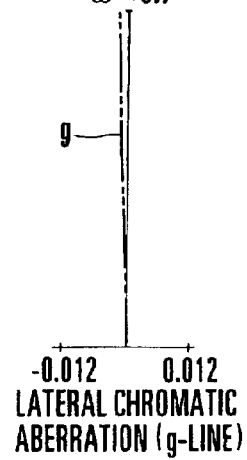
Figure 12A:
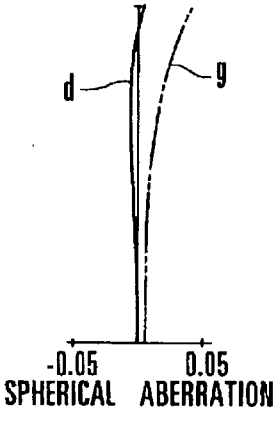
FIGS. 12A to 12D are graphic representations of the aberrations of the zoom lens of numerical example 3 in the telephoto end.
Figure 12B:
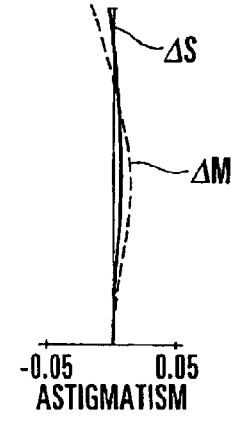
Figure 12C:
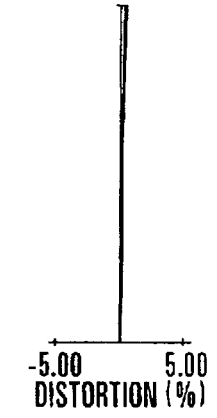
Figure 12D:
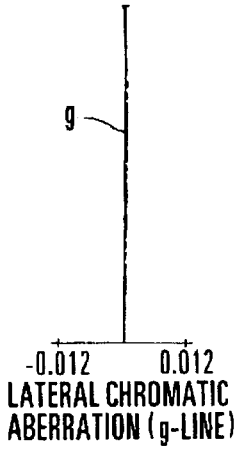

FIG. 9 in block diagram shows a numerical example 3 of the rear-focus type zoom lens according to the first embodiment of the invention. FIGS. 10A to 10D, FIGS. 11A to 11D and FIGS. 12A to 12D graphically show the aberrations of the zoom lens of numerical example 3 at the wide-angle end, at the middle focal length position and at the telephoto end, respectively.

Referring to FIGS. 1, 5 and 9, the zoom lens comprises, in order from an object side to an image side, a first lens unit L1 of positive refractive power, a second lens unit L2 of negative refractive power, a third lens unit L3 of positive refractive power and a fourth lens unit L4 of positive refractive power. An aperture stop SP is positioned in front of the third lens unit L3. A color separation prism, a face plate and a filter are represented by a glass block G. Reference character IP stands for an image plane in which a CCD or like image pickup element is disposed.

In the numerical examples 1 to 3, during zooming from the wide-angle end to the telephoto end, as indicated by the arrows in FIGS. 1, 5 and 9, the second lens unit axially moves toward the image side, while the fourth lens unit axially moves in part or as a whole (in the numerical examples 1 to 3, as a whole) in a locus convex toward the object side to compensate for the shift of the image plane with a variation of the focal length.

For focusing purposes, the fourth lens unit is also made axially movable in part or as a whole (in the numerical examples 1 to 3, as a whole), that is, the rear-focus method is employed. With an infinitely distant object or an object at the minimum distance, during zooming from the wide-angle end to the telephoto end, the fourth lens unit axially moves, while depicting a locus shown by the solid line curve 4a or dashed line curve 4b, respectively, in FIGS. 1, 5 and 9. Incidentally, the first and third lens units remain stationary during zooming and during focusing.

In the numerical examples 1 to 3, the provision for keeping the constant position of the image plane against zooming and the focusing provision both are made in one and the same lens unit, i.e., the fourth lens unit. In particular, as can be seen from the curves 4a and 4b in FIGS. 1, 5 and 9, a locus of motion of the fourth lens unit is made convex toward the object side. Such a locus allows the space between the third and fourth lens units to be utilized with an ever higher efficiency, thus advantageously achieving a shortening of the total length of the entire lens system.

In the numerical examples 1 to 3, with the setting in, for example, the telephoto end, during focusing from infinity to the minimum object distance, the fourth lens unit moves forward as indicated by a straight line 4c in FIGS. 1, 5 and 9.

It should now be pointed out that the most characteristic features in the first embodiment are that the second lens unit L2 is constructed with three negative lenses and one positive lens, totaling four separate single lenses and further that, among the surfaces constituting the third lens unit L3, both of the surfaces of at least one positive lens are made aspherical.

In more detail, for the zoom lens of such a configuration as in the first embodiment, the second lens unit L2 that contributes to a large variation of the focal length is made up from such a number of constituent lenses in such an arrangement as described above. The shares of the power the individual lenses take each are thus reduced to thereby assure much lowering of the Petzval sum. Despite the high zoom ratio, therefore, the variation of the field curvature with zooming is minimized. Further, since the second lens unit produces a diverging light beam, because the third lens unit L3 gets so large a diameter as to admit of that light beam, one or more double-aspherical positive lenses are used in the third lens unit, thus assuring improvements of even the level of optical performance. Also, this obviates the necessity of using the aspheric surface in the fourth lens unit, thereby producing an advantage in production cost. In the numerical examples 1 to 3, the asphere is used in both surfaces of a positive lens closest to the object side constituting part of the third lens unit L3.

For the numerical examples 1 to 3, the rules of lens design are set forth as above to obtain a high optical performance throughout the entire zooming range and throughout the entire focusing range.

The zoom lens according to the first embodiment can be realized by satisfying the features described above. To maintain good stability of the optical performance with the zoom ratio kept so high, it is preferable to satisfy at least one of the following features or conditions.

(a) The second lens unit L2 is constructed with, in order from an object side to an image side, a negative first lens having a concave surface of larger curvature facing the image side than that of an opposite surface thereof, a bi-concave negative second lens, a positive third lens having a convex surface of larger curvature facing the object side than that of an opposite surface a thereof, and a bi-concave negative fourth lens.

With the use of the zoom type as in the first embodiment, in order to increase the zoom ratio, the second lens unit L2 that contributes greatly to the function of varying the focal length must be necessarily made either larger in the total zooming movement, or shorter in focal length. The former method invites an increase of the size of the zoom lens, so that it is not favorable. The latter method, although not causing the size to increase, puts the second lens unit L2 under a larger strain of varying the focal length, so that it becomes difficult to maintain good stability of optical performance. Then, the second lens unit L2 is made up in such a manner as described above, producing the advantage of preventing the size of the entire lens system from increasing, while the optical performance, too, is maintained with good stability. Particularly as far as the second lens unit L2 is concerned, chromatic aberrations are corrected well by arranging the negative lens, the negative lens, the positive lens and the negative lens in this order from the object side, or by making a nearly symmetric power arrangement. That is, the principal point is achromatized well.

(b) In the third lens unit L3, the double aspheres for the positive lens are applied to the first lens, when counted from the object side. This makes it possible to correct aberrations ever more effectively. Particularly at the wide-angle end, the on-axial spherical aberration is corrected well. In this respect, it is desired to form the aspheric surface to such a shape that the positive refractive power becomes progressively weaker toward the margin thereof.

It has been known in the prior art to use one aspheric surface in the third lens unit. The limiting of the number of aspheric surfaces to one, however, has come and is coming in ever increasing difficulties of sufficiently improving the correction of aberrations and the compact form in the zoom lens configuration of the first embodiment. In other words, to further reduce the bulk of the entire lens system, it is important that the light beam decreases in diameter sufficiently as it passes through the third lens unit. What enters the third lens unit is the diverging rays of light from the second lens unit. To let them emerge in a converging light beam, therefore, as a rule, the third lens unit has borne a strong refractive power.

On this account, the first embodiment forms the positive lens of the third lens unit to a double-aspherical shape, thereby making it possible to reduce the diameter of the light beam in such a manner as to maintain a good state of aberrations. Owing to this, the separation between the third and fourth lens units can also be further reduced to decrease the size of the entire lens system. The improvements of the compact form are thus achieved. In particular, as the diverging rays are incident on the front surface of the double-aspherical lens and then refracted by that surface, the rays incident on the rear surface are made convergent. This allows the aberrations to be corrected well.

(c) The focal length f2 of the second lens unit lies within the following range:

$$0.24 < |f2/fA| < 0.33 \tag{1}$$

where $fA = \sqrt{fw \cdot ft}$
wherein fw and ft are focal lengths at the wide-angle end and the telephoto end of the entire lens system, respectively.

The above condition (1) is a condition for making appropriate the focal length (in other words, refractive power) of the second lens unit. When the upper limit of the condition (1) is exceeded, as this means that the focal length of the second lens unit is too long, the aberrations are favorably corrected, but the total zooming movement of the second lens unit must be increased to obtain the desired zoom ratio, causing the size of the entire lens system to increase objectionably. Conversely, when the lower limit is exceeded, the Petzval sum increases in the negative direction, causing the image plane to decline. So, it becomes difficult to keep hold of good optical performance.

(d) For the second lens unit, the mean Abbe number vp of materials of positive lenses which constitute the second lens unit and the mean Abbe number vn of materials of negative lenses which constitute the second lens unit lie within the respective following ranges:

$$36 < vn < 65 \tag{2}$$

$$20 < vp < 35 \tag{3}$$

The above conditions (2) and (3) are provided for correcting well the chromatic aberrations the second lens unit produces. As mentioned in the foregoing, the second lens unit contributes to a large variation of the focal length. Therefore, the aberrations the second lens unit produces must be corrected well. Particularly for the zoom lens whose zoom ratio is as high as 22 or more, it is important to correct chromatic aberrations well, too. When the upper limit of the condition (2) is exceeded, over-correction of longitudinal chromatic aberration results. Conversely, when the lower limit is exceeded, under-correction of longitudinal chromatic aberration results. Under condition (3), the phenomena to occur are reversed to those of the condition (2). In either case, when the upper or lower limit is exceeded, the chromatic aberrations are also hardly corrected well.

(e) To correct aberrations, the mean refractive index Nn of materials of negative lenses which constitute the second lens unit lies within the following range:

$$1.70 < Nn < 1.95 \tag{4}$$

The above condition (4), which correlates with the condition (1), is a condition for preventing the Petzval sum from deteriorating, by using high-refractive-index glasses in the negative lenses. When the limits are exceeded, the curvature of field deteriorates.

(f) Letting the radius of curvature of the i-th lens surface, when counted from the object side, in the second lens unit be denoted by R2i, it is preferable to satisfy at least one of the following conditions:

$$0.82 < |R22/f2| < 1.07 \tag{5}$$

$$1.66 < |R24/R25| < 4.00 \tag{6}$$

$$1.00 < |R26/R27| < 1.46 \tag{7}$$

The above conditions (5) to (7) are provided for correcting mainly spherical aberration, coma, astigmatism and field curvature in good balance.

When the upper limit of the condition (5) is exceeded, coma becomes large. Conversely, when the lower limit is exceeded, the image plane comes to bend concave toward the object side. So, these violations are objectionable.

The condition (6) is provided for correcting the various aberrations by cancellation between each other's surfaces. When the upper limit of the condition (6) is exceeded, under-correction of spherical aberration results. So, the violation is objectionable. Conversely, when the lower limit is exceeded, the inward coma increases objectionably.

When the upper limit of condition (7) is exceeded, spherical aberration is objectionably over-corrected. Conversely, when the lower limit is exceeded, barrel-type distortion in the wide-angle end increases objectionably.

On the conditions (5) to (7), satisfaction of any one of the conditions gives the respective individual effect and result. However, needless to say here, simultaneous satisfaction of all the conditions (5) to (7) is desired from the viewpoint of the aberration correction.

(g) The focal length f3 of the third lens unit lies within the following range:

$$0.86 < |f3/fA| < 1.09 \tag{8}$$

The above condition (8) is a condition for making appropriate the focal length (in other words, power) of the third lens unit. When the focal length of the third lens unit is longer than the upper limit of the condition (8), the strain of the third lens unit on variation of the focal length becomes lighter, so that it is favorable for correcting aberrations. However, the strain on the fourth lens unit to vary the focal length becomes heavy. So, it becomes necessary to increase the number of lens elements in the fourth lens unit and put an aspherical lens or lenses therein. Therefore, it becomes difficult to improve the compact form. Conversely, when the lower limit is exceeded, as this means that the strain on the third lens unit to vary the focal length is too heavy, the optical performance, especially with respect to spherical aberration, detracts from the good level. So, the violation is objectionable.

(h) The magnification β4T of the fourth lens unit at the telephoto end with an object at infinity lies within the following range:

$$0.40 < \beta 4T < 0.55 \tag{9}$$

This factor relates to the focal length of the fourth lens unit. When the magnification of the fourth lens unit is higher than the upper limit of the condition (9), the amount of movement of the fourth lens unit becomes large, hindering the size from being minimized. Conversely, when the lower limit is exceeded, the back focal distance increases objectionably.

Next, three numerical examples 1 to 3 of the first embodiment are shown in detail. In the numerical data for the examples 1 to 3, Ri is the radius of curvature of the i-th lens surface, when counted from the object side, Di is the axial separation (lens thickness or air space) between the i-th and (i+1)st surfaces, and Ni and νi are respectively the refractive index and Abbe number of the material of the i-th lens element.

The shape of an aspheric surface is expressed in the coordinates with an X axis in the direction of an optical axis and an H axis in the direction perpendicular to the optical axis, the direction in which light advances being taken as positive, by the following equation:

$$X = \frac{(1/R)H^2}{1+\sqrt{1-(1+K)(H/R)^2}} + BH^4 + CH^6 + DH^8 + EH^{10} + FH^{12}$$

where R is the radius of the osculating sphere, and K, B, C, D, E and F are the aspheric coefficients.

Also, it is to be noted that the notation of "e-Z", for example, means "$10^{-Z}$".

The values of the factors in the above-described conditions (1) to (9) for the numerical examples 1 to 3 are listed in Table-1.

Numerical Example 1:
f = 1~22.30    Fno = 1.65~3.91    2ω = 57.6°~2.8°

| | | | | |
|---|---|---|---|---|
| R1 = | 11.212 | D1 = 0.32 | N1 = 1.846660 | ν1 = 23.8 |
| R2 = | 6.058 | D2 = 1.22 | N2 = 1.603112 | ν2 = 60.6 |
| R3 = | −82.529 | D3 = 0.05 | | |
| R4 = | 5.587 | D4 = 0.68 | N3 = 1.696797 | ν3 = 55.5 |
| R5 = | 14.317 | D5 = Variable | | |
| R6 = | 7.675 | D6 = 0.20 | N4 = 1.834000 | ν4 = 37.2 |
| R7 = | 1.241 | D7 = 0.66 | | |
| R8 = | −4.048 | D8 = 0.17 | N5 = 1.834807 | ν5 = 42.7 |
| R9 = | 6.949 | D9 = 0.07 | | |
| R10 = | 2.501 | D10 = 0.67 | N6 = 1.846660 | ν6 = 23.8 |
| R11 = | −3.408 | D11 = 0.04 | | |
| R12 = | −2.782 | D12 = 0.17 | N7 = 1.804000 | ν7 = 46.6 |
| R13 = | 6.600 | D13 = Variable | | |
| R14 = | Stop | D14 = 0.15 | | |
| R15* = | 2.129 | D15 = 1.05 | N8 = 1.583126 | ν8 = 59.4 |
| R16* = | −6.481 | D16 = 0.05 | | |
| R17 = | 3.123 | D17 = 0.20 | N9 = 1.846660 | ν9 = 23.8 |
| R18 = | 1.807 | D18 = Variable | | |
| R19 = | 3.092 | D19 = 0.68 | N10 = 1.516330 | ν10 = 64.1 |
| R20 = | −2.037 | D20 = 0.17 | N11 = 1.805181 | ν11 = 25.4 |
| R21 = | −3.768 | D21 = Variable | | |
| R22 = | ∞ | D22 = 0.81 | N12 = 1.516330 | ν12 = 64.2 |
| R23 = | ∞ | | | |

*) Aspheric Surface

| Variable | Focal Length | | |
|---|---|---|---|
| Separation | 1.00 | 8.95 | 22.30 |
| D5 | 0.17 | 4.79 | 5.67 |
| D13 | 5.95 | 1.33 | 0.45 |
| D18 | 2.85 | 1.17 | 3.27 |
| D21 | 0.73 | 2.42 | 0.32 |

Aspheric Coefficients:

R15:  K = −2.95062e+00   B = 2.77965e−02   C = −4.26812e−03
      D = −3.54540e−04   E = 1.02158e−03   F = −3.32079e−04
R16:  K = −1.61171e+01   B = 4.17705e−03   C = −2.13701e−03
      D = 2.19892e−03   E = −8.75276e−04   E = 2.08033e−05

Numerical Example 2:
f = 1~24.54    Fno = 1.65~4.02    2ω = 57.9°~2.6°

| | | | | |
|---|---|---|---|---|
| R1 = | 11.033 | D1 = 0.32 | N1 = 1.846660 | ν1 = 23.8 |
| R2 = | 6.233 | D2 = 1.34 | N2 = 1.603112 | ν2 = 60.6 |
| R3 = | −77.014 | D3 = 0.05 | | |
| R4 = | 5.701 | D4 = 0.69 | N3 = 1.638539 | ν3 = 55.4 |
| R5 = | 13.327 | D5 = Variable | | |
| R6 = | 6.654 | D6 = 0.20 | N4 = 1.834000 | ν4 = 37.2 |
| R7 = | 1.222 | D7 = 0.69 | | |
| R8 = | −3.818 | D8 = 0.17 | N5 = 1.834807 | ν5 = 42.7 |
| R9 = | 9.572 | D9 = 0.12 | | |
| R10 = | 2.639 | D10 = 0.64 | N6 = 1.846660 | ν6 = 23.8 |
| R11 = | −3.900 | D11 = 0.01 | | |
| R12 = | −3.497 | D12 = 0.17 | N7 = 1.804000 | ν7 = 46.6 |
| R13 = | 5.438 | D13 = Variable | | |
| R14 = | Stop | D14 = 0.15 | | |
| R15* = | 2.264 | D15 = 1.04 | N8 = 1.583126 | ν8 = 59.4 |
| R16* = | −6.688 | D16 = 0.05 | | |
| R17 = | 3.418 | D17 = 0.20 | N9 = 1.846660 | ν9 = 23.8 |
| R18 = | 1.995 | D18 = Variable | | |
| R19 = | 3.275 | D19 = 0.74 | N10 = 1.516330 | ν10 = 64.1 |
| R20 = | −1.950 | D20 = 0.17 | N11 = 1.805181 | ν11 = 25.4 |
| R21 = | −3.563 | D21 = Variable | | |
| R22 = | ∞ | D22 = 0.81 | N12 = 1.516330 | ν12 = 64.2 |
| R23 = | ∞ | | | |

*) Aspheric Surface

| Variable | Focal Length | | |
|---|---|---|---|
| Separation | 1.00 | 9.49 | 24.54 |
| D5 | 0.21 | 5.27 | 6.23 |
| D13 | 6.25 | 1.20 | 0.23 |
| D18 | 3.12 | 1.23 | 3.48 |
| D21 | 0.74 | 2.62 | 0.37 |

Aspheric Coefficients:

R15:  K = −2.99695e+00   B = 2.31988e−02   C = −1.67619e−03
      D = −5.45254e−04   E = 6.77550e−04   F = −1.69552e−04
R16:  K = −7.75069e+00   B = 6.76237e−03   C = 1.45357e−04
      D = 6.41149e−04   E = −2.21028e−04   F = −2.54219e−05

Numerical Example 3:
f = 1~19.99    Fno = 1.85~3.52    2ω = 57.5°~3.1°

| | | | | |
|---|---|---|---|---|
| R1 = | 11.418 | D1 = 0.32 | N1 = 1.846660 | ν1 = 23.8 |
| R2 = | 6.159 | D2 = 1.28 | N2 = 1.603112 | ν2 = 60.6 |
| R3 = | −54.401 | D3 = 0.05 | | |
| R4 = | 5.371 | D4 = 0.68 | N3 = 1.638539 | ν3 = 55.4 |
| R5 = | 13.218 | D5 = Variable | | |
| R6 = | 11.860 | D6 = 0.20 | N4 = 1.834000 | ν4 = 37.2 |
| R7 = | 1.266 | D7 = 0.58 | | |
| R8 = | −4.968 | D8 = 0.17 | N5 = 1.804000 | ν5 = 46.6 |
| R9 = | 4.967 | D9 = 0.15 | | |
| R10 = | 2.681 | D10 = 0.59 | N6 = 1.846660 | ν6 = 23.8 |
| R11 = | −5.821 | D11 = 0.03 | | |
| R12 = | −4.397 | D12 = 0.17 | N7 = 1.772499 | ν7 = 49.6 |
| R13 = | 8.565 | D13 = Variable | | |
| R14 = | Stop | D14 = 0.24 | | |
| R15* = | 2.197 | D15 = 0.88 | N8 = 1.583126 | ν8 = 59.4 |
| R16* = | −6.237 | D16 = 0.07 | | |
| R17 = | 3.230 | D17 = 0.20 | N9 = 1.805181 | ν9 = 25.4 |
| R18 = | 1.899 | D18 = Variable | | |
| R19 = | 3.521 | D19 = 0.61 | N10 = 1.516330 | ν10 = 64.1 |
| R20 = | −1.986 | D20 = 0.17 | N11 = 1.805181 | ν11 = 25.4 |
| R21 = | −3.697 | D21 = Variable | | |
| R22 = | ∞ | D22 = 0.80 | N12 = 1.516330 | ν12 = 64.2 |
| R23 = | ∞ | | | |

*) Aspheric Surface

| Variable | Focal Length | | |
|---|---|---|---|
| Separation | 1.00 | 8.47 | 19.99 |
| D5 | 0.21 | 4.90 | 5.79 |
| D13 | 6.00 | 1.30 | 0.41 |

-continued

|  | | | |
|---|---|---|---|
| D18 | 2.78 | 1.13 | 2.90 |
| D21 | 0.73 | 2.39 | 0.61 |

Aspheric Coefficients:

R15: K = −2.50798e+00  B = 2.04055e−02  C = −2.87508e−03
     D = −6.23936e−04  E = 1.08180e−03  F = −2.36535e−04
R16: K = −8.84264e+00  B = 6.94108e−03  C = −3.62483e−03
     D = 1.84163e−03   E = −1.00394e−05 F = −9.76033e−05

TABLE 1

| Condition | Numerical Example | | |
|---|---|---|---|
| No. & Factor | 1 | 2 | 3 |
| (1) \|f2/fA\| | 0.27 | 0.27 | 0.30 |
| (2) νn | 42.2 | 42.2 | 44.4 |
| (3) νp | 23.8 | 23.8 | 23.8 |
| (4) Nn | 1.82 | 1.82 | 1.80 |
| (5) \|R22/f2\| | 0.97 | 0.92 | 0.95 |
| (6) \|R24/R25\| | 2.78 | 3.63 | 1.85 |
| (7) \|R26/R27\| | 1.23 | 1.12 | 1.32 |
| (8) \|f3/fA\| | 0.97 | 0.96 | 0.99 |
| (9) β4T | 0.50 | 0.50 | 0.50 |

It will be appreciated from the foregoing that, according to the first embodiment, the bulk and size of the entire lens system are minimized and, despite the very high zoom ratio and as fast a speed as about 1.6 in F-number, a high optical performance is obtained. Such a zoom lens is achieved by using a smaller number of constituent lenses than was heretofore usual. Further, an excellent optical apparatus using the zoom lens can be realized.

Another or second embodiment of the present invention is described in detail by reference to the drawings below.

Figure 13:
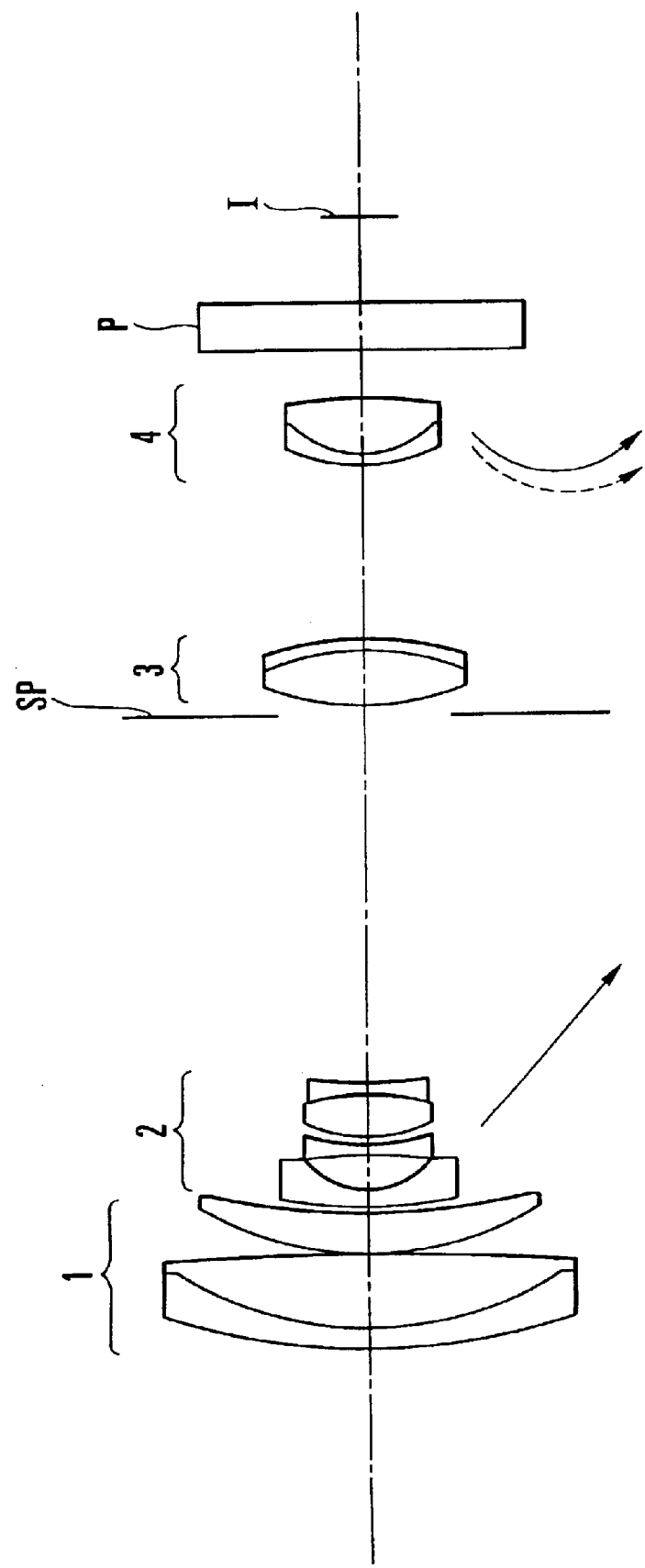
FIG. 13 is a longitudinal section view of a numerical example 4 of the zoom lens.
Figure 15:
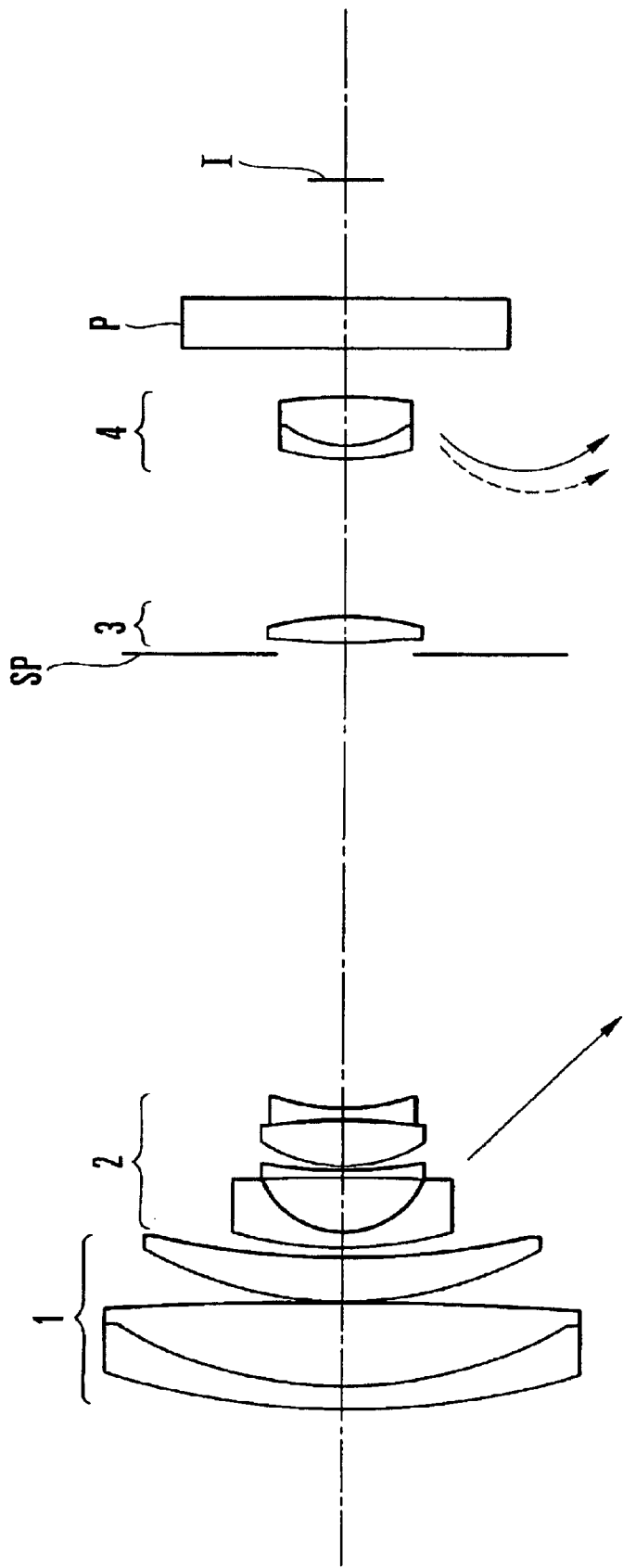
FIG. 15 is a longitudinal section view of a numerical example 5 of the zoom lens.
Figure 17:
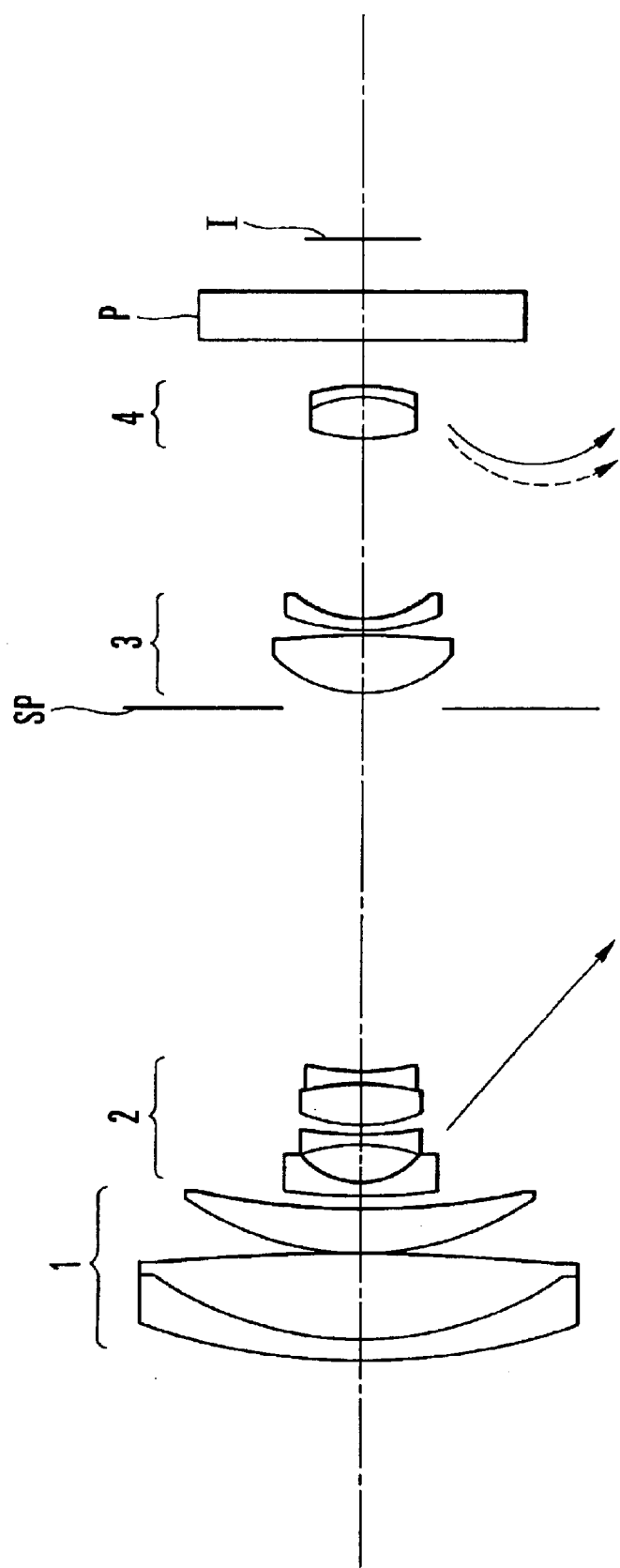
FIG. 17 is a longitudinal section view of a numerical example 6 of the zoom lens.

FIGS. 13, 15 and 17 in block diagram show numerical examples 4 to 6 of the zoom lens according to the second embodiment. FIGS. 14A1 to 14A4, 14B1 to 14B4 and 14C1 to 14C4, FIGS. 16A1 to 16A4, 16B1 to 16B4 and 16C1 to 16C4 and FIGS. 18A1 to 18A4, 18B1 to 18B4 and 18C1 to 18C4 show the aberrations of the zoom lenses of numerical examples 4 to 6, respectively, in three different operative positions. FIGS. 14A1 to 14A4, 16A1 to 16A4 and 18A1 to 18A4 show the aberrations at the wide-angle end, FIGS. 14B1 to 14B4, 16B1 to 16B4 and 18B1 to 18B4 show the aberrations at a middle focal length position, and FIGS. 14C1 to 14C4, 16C1 to 16C4 and 18C1 to 18C4 show the aberrations at the telephoto end. In the aberration curves, d and g stand for the spectral d- and g-lines, respectively, and ΔM and ΔS stand for the meridional and sagittal image surfaces, respectively. The lateral chromatic aberration is expressed by the g-line.

In the lens block diagrams of FIGS. 13, 15 and 17, reference numerals 1 to 4 denote the first to fourth lens units, respectively, SP stands for the stop, P stands for a glass block such as the face plate of the CCD and an optical low-pass filter, and IP stands for the image plane. In the numerical examples 4 to 6, during zooming from the wide-angle end to the telephoto end, as indicated by the arrows in FIGS. 13, 15 and 17, the second lens unit 2 axially moves toward the image side, while the fourth lens unit 4 axially moves to compensate for the shift of the image plane with variation of the focal length. The first lens unit 1, the third lens unit 3 and the stop SP remain stationary during zooming.

The locus of zooming movement of the fourth lens unit 4 differs with different object distances. The locus shown by the solid line in FIGS. 13, 15 and 17 is for an infinitely distant object, and the locus shown by the dashed line is for an object at the minimum distance. That is, the zoom lenses of the numerical examples 4 to 6 employ the rear-focus method in which the fourth lens unit is axially moved for focusing.

Now, the most characteristic features in the second embodiment are that the second lens unit 2 is constructed with three negative lenses and one positive lens, totaling four single lenses, and further that, among the lenses constituting the second lens unit 2, at least one lens is made aspherical.

In more detail, for the zoom lens of the type as in the second embodiment, if the second lens unit 2 that contributes to a large variation of the focal length is made up in such a way as described above, the share of the power each lens unit should take can be decrease to assure reduction of the Petzval sum. By this, even if the zoom ratio is made high, the variation of field curvature with zooming can be lessened. Further, the use of one or more aspheric surfaces in the second lens unit 2 can assure an increase of the level of optical performance, too. In the numerical examples 4 to 6, the front surface of the positive lens in the second lens unit is aspherical.

The features described above suffice for achieving the second embodiment. To further improve the aberration correction, it is desired that the second lens unit 2 is constructed as comprising, in order from an object side to an image side, a negative first lens having a concave surface of larger curvature facing the image side than that of an opposite surface thereof, a bi-concave negative second lens, a positive third lens having a convex surface of larger curvature facing the object side than that of an opposite surface thereof and a bi-concave negative fourth lens.

With the use of the zoom type as in the first embodiment, in order to increase the zoom ratio, the second lens unit 2 that contributes greatly to the function of varying the focal length must be necessarily made either larger in the total zooming movement, or shorter in focal length. The former method is unfavorable because it increases the size of the zoom lens. The latter method, although not causing the size to increase, puts a large strain on the second lens unit 2, causing good stability of the optical performance to be hardly maintained. Taking these into account, the second lens unit L2 is made up in such a manner as described above. By this, the size of the entire lens system is prevented from increasing, and the optical performance, too, is maintained with good stability. Particularly, as far as the second lens unit L2 is concerned, the power arrangement is made nearly symmetrical. In other words, the negative lens, the negative lens, the positive lens and the negative lens are arranged in this order from the object side, thereby correcting chromatic aberrations well. That is, the achromatism of the principal point is effected well. In addition, the aspheric surface is used to improve the off-axial optical performance.

Furthermore, the aspheric surface in the second lens unit takes its place in the positive third lens. With this arrangement, it becomes possible to correct aberrations more effectively. Particularly, the off-axial flare can be corrected well. For this purpose, it is desired to form the aspheric surface to such a shape that the positive refractive power becomes progressively weaker toward the marginal zone of the lens.

Also, letting the focal lengths at the wide-angle end and the telephoto end of the entire lens system be denoted by fw and ft, respectively, the focal length f2 of the second lens unit is desired to fall within the following range:

$$0.25 < |f2/fA| < 0.41 \quad (10)$$

where $fA = \sqrt{fw \cdot ft}$.

The above condition (10) is a condition for making appropriate the focal length (in other words, refractive power) of the second lens unit. When the upper limit of the condition (10) is exceeded, as this means that the focal length of the second lens unit is too long, the aberrations are favorably corrected, but the total zooming movement of the second lens unit must be increased to obtain the desired zoom ratio, causing the size of the entire lens system to increase objectionably. Conversely, when the lower limit is exceeded, the Petzval sum increases in the negative direction, causing the image plane to decline. So, it becomes difficult to keep hold of good optical performance.

Also, the mean Abbe number vp of materials of positive lens in the second lens unit and the mean Abbe number vn of materials of negative lenses in the second lens unit are desired to fall within the respective following ranges:

$$36 < vn < 65 \quad (11)$$

$$20 < vp < 35 \quad (12)$$

The above inequalities of conditions (11) and (12) have an aim to correct well the chromatic aberrations the second lens unit produces. As mentioned in the foregoing, the second lens unit contributes to a large variation of the focal length. Therefore, the aberrations the second lens unit produces must be corrected well. Particularly for the zoom lens of as high a range as exceeding 20, it is of importance that chromatic aberrations, too, be corrected well. When the upper limit of the condition (11) is exceeded, over-correction of longitudinal chromatic aberration results. Conversely, when the lower limit is exceeded, under-correction of longitudinal chromatic aberration results. Under condition (12), the phenomena to occur are reversed to those of the condition (11). However, it is still valid that, when the upper or lower limit is exceeded, the chromatic aberrations are hardly corrected well.

To further improve the aberration correction, the mean refractive index Nn of materials of negative lenses in the second lens unit is desired to fall within the following range:

$$1.71 < Nn < 1.95 \quad (13)$$

The above condition (13), which correlates with the condition (10), is a condition for preventing the Petzval sum from deteriorating, by using high-refractive-index glasses in the negative lenses. When the limits are exceeded, the curvature of field deteriorates.

Letting the radius of curvature of the i-th lens surface, when counted from the object side, in the second lens unit be denoted by R2i, it is also preferable to satisfy at least one of the following conditions:

$$0.79 < |R22/f2| < 1.32 \quad (14)$$

$$1.28 < |R24/R25| < 3.20 \quad (15)$$

$$0.98 < |R26/R27| < 3.55 \quad (16)$$

The above conditions (14) to (16) have an aim to correct spherical aberration, coma, astigmatism and field curvature in good balance.

When the upper limit of the condition (14) is exceeded, large coma is produced. Conversely, when the lower limit is exceeded, the image plane is curved concave toward the object side. So, these violations are objectionable.

The condition (15) is a condition for correcting the various aberrations by cancellation between each other's surfaces. When the upper limit of the condition (15) is exceeded, under-correction of spherical aberration results. So, the violation is objectionable. Conversely, when the lower limit is exceeded, the inward coma increases objectionably.

When the upper limit of condition (16) is exceeded, spherical aberration is objectionably over-corrected. Conversely, when the lower limit is exceeded, barrel-type distortion at the wide-angle end increases objectionably.

On the conditions (14) to (16), satisfaction of any one of the conditions gives the respective individual effect and result. However, needless to say here, simultaneous satisfaction of all the conditions is desired from the viewpoint of the aberration correction.

The data for the numerical examples 4 to 6 of the second embodiment are described below.

Also, the values of the factors in the above-described conditions (10) to (16) for the numerical examples 4 to 6 are listed in Table-2.

Numerical Example 4:
$f = 1 \sim 20.09 \quad Fno = 1.45 \sim 3.80 \quad 2\omega = 57.5° \sim 3.1°$

| | | | | |
|---|---|---|---|---|
| R1 = | 11.602 | D1 = 0.30 | N1 = 1.846660 | v1 = 23.8 |
| R2 = | 5.983 | D2 = 1.13 | N2 = 1.603112 | v2 = 60.6 |
| R3 = | −65.031 | D3 = 0.05 | | |
| R4 = | 5.350 | D4 = 0.63 | N3 = 1.696797 | v3 = 55.5 |
| R5 = | 13.654 | D5 = Variable | | |
| R6 = | 9.563 | D6 = 0.20 | N4 = 1.834807 | v4 = 42.7 |
| R7 = | 1.419 | D7 = 0.57 | | |
| R8 = | −7.401 | D8 = 0.17 | N5 = 1.834000 | v5 = 37.2 |
| R9 = | 3.555 | D9 = 0.12 | | |
| R10* = | 2.506 | D10 = 0.66 | N6 = 1.846660 | v6 = 23.8 |
| R11 = | −4.170 | D11 = 0.05 | | |
| R12 = | −3.062 | D12 = 0.17 | N7 = 1.882997 | v7 = 40.8 |
| R13 = | 12.531 | D13 = Variable | | |
| R14 = | (Stop) | D14 = 0.24 | | |
| R15* = | 4.296 | D15 = 0.83 | N8 = 1.583126 | v8 = 59.4 |
| R16 = | −4.552 | D16 = 0.17 | N9 = 1.846660 | v9 = 23.8 |
| R17 = | −6.489 | D17 = Variable | | |
| R18 = | 3.016 | D18 = 0.17 | N19 = 1.805181 | v10 = 25.4 |
| R19 = | 1.615 | D19 = 0.83 | N11 = 1.583126 | v11 = 59.4 |
| R20 = | −7.510 | D20 = Variable | | |
| R21* = | ∞ | D21 = 0.80 | N12 = 1.516330 | v12 = 64.2 |
| R22 = | ∞ | | | |

*) Aspheric Surface

| Variable | Focal Length | | |
|---|---|---|---|
| Separation | 1.00 | 6.64 | 20.09 |
| D5 | 0.13 | 4.33 | 5.52 |
| D13 | 5.68 | 1.48 | 0.29 |
| D17 | 2.75 | 1.46 | 3.58 |
| D20 | 1.22 | 2.51 | 0.39 |

Aspheric Coefficients:

R10: K = 2.26914e−02  B = −3.85620e−04  C = 1.31875e−04
     D = 5.87667e−05  E = −7.29183e−04

R15: K = −8.90748e−01  B = −3.94769e−03  C = 4.25368e−04
     D = −1.77499e−04  E = 3.13494e−05

R20: K = −1.22783e+01  B = −2.03783e−03  C = 2.76322e−03
     D = −3.99845e−03  E = 3.24721e−03  F = −1.41807e−03

-continued

Numerical Example 5:
f = 1~20.00  Fno = 1.89~3.18  2ω = 57.5°~3.1°

| | | | | | |
|---|---|---|---|---|---|
| R1 = | 13.233 | D1 = 0.34 | N1 = 1.846660 | ν1 = 23.8 |
| R2 = | 7.170 | D2 = 1.27 | N2 = 1.603112 | ν2 = 60.6 |
| R3 = | −105.995 | D3 = 0.05 | | |
| R4 = | 6.330 | D4 = 0.68 | N3 = 1.696797 | ν3 = 55.5 |
| R5 = | 14.095 | D5 = Variable | | |
| R6 = | 7.072 | D6 = 0.20 | N4 = 1.834807 | ν4 = 42.7 |
| R7 = | 1.465 | D7 = 0.80 | | |
| R8 = | −30.695 | D8 = 0.17 | N5 = 1.834000 | ν5 = 37.2 |
| R9 = | 6.535 | D9 = 0.07 | | |
| R10* = | 2.273 | D10 = 0.68 | N6 = 1.846660 | ν6 = 23.8 |
| R11 = | −20.040 | D11 = 0.06 | | |
| R12 = | −6.212 | D12 = 0.17 | N7 = 1.882997 | ν7 = 40.8 |
| R13 = | 4.029 | D13 = Variable | | |
| R14 = | (Stop) | D14 = 0.24 | | |
| R15* = | 7.266 | D15 = 0.42 | N8 = 1.589130 | ν8 = 61.1 |
| R16* = | −6.822 | D16 = Variable | | |
| R17 = | 3.832 | D17 = 0.20 | N9 = 1.805181 | ν9 = 25.4 |
| R18 = | 1.708 | D18 = 0.73 | N10 = 1.622992 | ν10 = 58.2 |
| R19 = | −5.692 | D19 = Variable | | |
| R20 = | ∞ | D20 = 0.80 | N11 = 1.516330 | ν11 = 64.2 |
| R21 = | ∞ | | | |

*) Aspheric Surface

| Variable | Focal Length | | |
|---|---|---|---|
| Separation | 1.00 | 7.34 | 20.00 |
| D5 | 0.17 | 5.43 | 6.91 |
| D13 | 7.07 | 1.81 | 0.33 |
| D16 | 2.51 | 1.24 | 2.95 |
| D19 | 1.22 | 2.50 | 0.78 |

Aspheric Coefficients:

R10: K = 1.70649e−01  B = 6.91700e−05  C = 3.75749e−04
     D = −1.12207e−03  E = 3.99870e−04  F = 3.59130e−04
R15: K = −2.43481e+00  B = −1.30559e−02  C = −1.05458e−03
     D = −4.16775e−03  E = −1.22870e−05
R20: K = 2.53727e−01  B = −8.97451e−03  C = −1.43273e−03
     D = −3.76794e−03  E = −9.23858e−04  F = 2.32567e−06

Numerical Example 6:
f = 1~20.01  Fno = 1.85~3.57  2ω = 57.5°~3.1°

| | | | | | |
|---|---|---|---|---|---|
| R1 = | 11.768 | D1 = 0.32 | N1 = 1.846660 | ν1 = 23.8 |
| R2 = | 6.152 | D2 = 1.28 | N2 = 1.603112 | ν2 = 60.6 |
| R3 = | −36.138 | D3 = 0.05 | | |
| R4 = | 5.155 | D4 = 0.68 | N3 = 1.638539 | ν3 = 55.4 |
| R5 = | 12.283 | D5 = Variable | | |
| R6 = | 11.941 | D6 = 0.20 | N4 = 1.834000 | ν4 = 37.2 |
| R7 = | 1.326 | D7 = 0.58 | | |
| R8 = | −2.951 | D8 = 0.17 | N5 = 1.804000 | ν5 = 46.6 |
| R9 = | 7.313 | D9 = 0.15 | | |
| R10* = | 2.515 | D10 = 0.59 | N6 = 1.846660 | ν6 = 23.8 |
| R11 = | −5.746 | D11 = 0.03 | | |
| R12 = | −5 251 | D12 = 0.17 | N7 = 1.772499 | ν7 = 49.6 |
| R13 = | 5.609 | D13 = Variable | | |
| R14 = | (Stop) | D14 = 0.24 | | |
| R15* = | 1.988 | D15 = 0.88 | N8 = 1.583126 | ν8 = 59.4 |
| R16* = | −6.724 | D16 = 0.07 | | |
| R17 = | 3.021 | D17 = 0.20 | N9 = 1.805181 | ν9 = 25.4 |
| R18 = | 1.756 | D18 = Variable | | |
| R19 = | 2.963 | D19 = 0.61 | N10 = 1.516330 | ν10 = 64.1 |
| R20 = | −1.935 | D20 = 0.17 | N11 = 1.805181 | ν11 = 25.4 |
| R21 = | −4.000 | D21 = Variable | | |
| R22 = | ∞ | D22 = 0.80 | N12 = 1.516330 | ν12 = 64.2 |
| R23 = | ∞ | | | |

*) Aspheric Surface

| Variable | Focal Length | | |
|---|---|---|---|
| Separation | 1.00 | 6.57 | 20.01 |
| D5 | 0.21 | 4.35 | 5.51 |
| D13 | 5.68 | 1.54 | 0.37 |
| D18 | 2.82 | 1.12 | 2.94 |
| D21 | 0.73 | 2.43 | 0.61 |

Aspheric Coefficients:

R10: K = −1.09373e+00  B = −2.56364e−03  C = 3.87936e−03
     D = −7.39355e−04  E = −5.96622e−03  F = 3.58603e−03
R15: K = −2.19525e+00  B = 2.43661e−02  C = −3.38432e−03
     D = −7.29503e−04  E = 1.50629e−03  F = −2.62456e−04
R20: K = −2.53128e+01  B = 4.68360e−03  C = −3.67596e−03
     D = 2.50751e−03  E = −4.68734e−06  F = −4.93152e−05

TABLE 2

| Condition | Numerical Example | | |
|---|---|---|---|
| No. | 4 | 5 | 6 |
| (10) | 0.31 | 0.37 | 0.28 |
| (11) | 40.2 | 40.2 | 44.4 |
| (12) | 23.8 | 23.8 | 23.8 |
| (13) | 1.85 | 1.85 | 1.80 |
| (14) | 1.20 | 0.88 | 1.05 |
| (15) | 1.42 | 2.88 | 2.91 |
| (16) | 1.36 | 3.23 | 1.09 |

It will be appreciated from the foregoing that, according to the second embodiment, the bulk and size of the entire lens system are minimized and, despite the very high zoom ratio, while still increasing the speed to about 1.4 in F-number, a high level of optical performance is obtained. Such a zoom lens is made possible by using a smaller number of constituent lenses than was heretofore usual.

Next, a practical example of a video camera using any one of the zoom lenses of numerical examples 1 to 6 as the photographic optical system is described by reference to FIG. 19.

Figure 19:
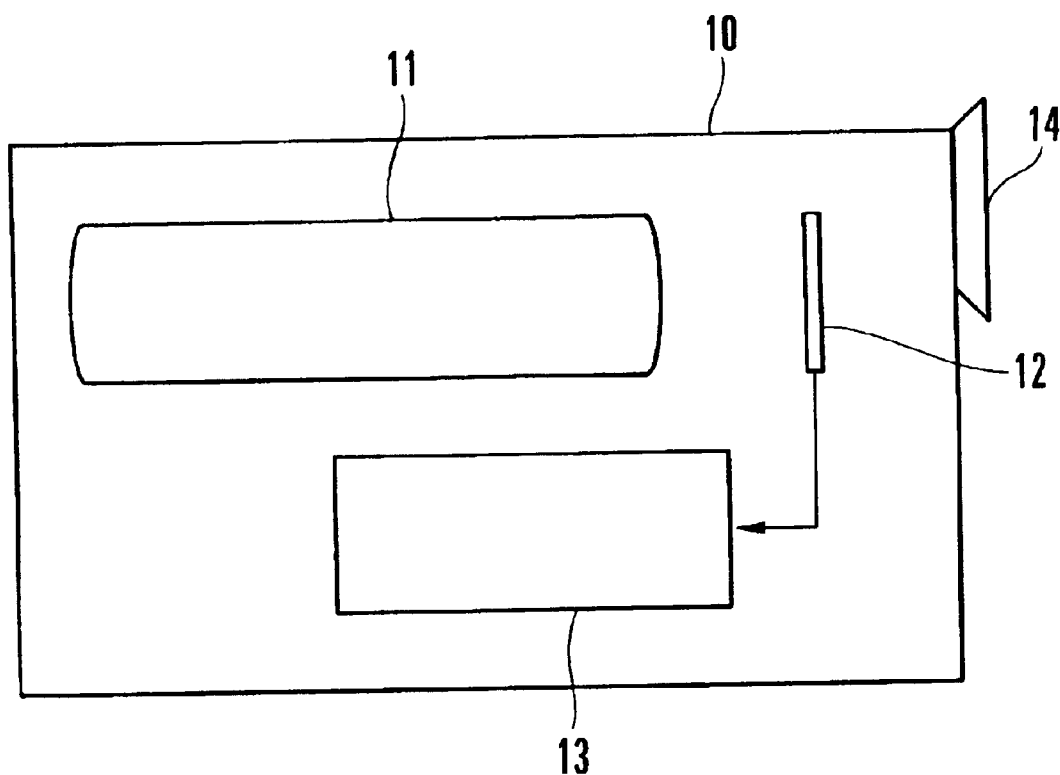
FIG. 19 is a schematic diagram for explaining an example of application of the zoom lens of each of the numerical examples 1 to 6 to the video camera.

In FIG. 19, the video camera has a body 10 in which a photographic optical system 11 in the form of the zoom lens of each of the numerical examples 1 to 6 is incorporated. By the photographic optical system 11, an image of an object being photographed is formed on an image pickup element 12, such as CCD. An electrical signal representing the object image is transferred from the image pickup element 12 to, and stored in, a recording medium 13. The photographer, looking through a viewfinder 14, observes an object image on a display (not shown). The display is formed by a liquid crystal panel on which an equivalent image to that on the image pickup element 12 appears.

In such a manner, the zoom lens of each of the numerical examples 1 to 6 is applied to the video camera or like optical apparatus. An optical apparatus of reduced size with high optical performance can thus be realized.

What is claimed is:

1. A zoom lens comprising, in order from an object side to an image side,
   a first lens unit of positive refractive power,
   a second lens unit of negative refractive power,
   a third lens unit of positive refractive power, and
   a fourth lens unit of positive refractive power, zooming from a wide-angle end to a telephoto end being effected by moving said second lens unit toward the image side, and shifting of an image plane due to zooming being compensated for by moving said fourth lens unit,
   wherein said second lens unit consists of four lenses including three negative lenses and one positive lens, and at least one of said four lenses is an aspherical lens, and wherein the zoom lens satisfies the following condition:

$$1.28 < |R24/R25| < 3.20$$

where R24 and R25 are radii of curvature of the fourth and fifth lens surfaces, respectively, when counted from the object side, in said second lens unit.

2. A zoom lens according to claim 1, wherein said second lens unit consists of, in order from the object side to the image side,
- a negative first lens having a concave surface of larger curvature facing the image side than that of an opposite surface thereof,
- a biconcave negative second lens,
- a positive third lens having a convex surface of larger curvature facing the object side than that of an opposite surface thereof, and
- a bi-concave negative fourth lens.

3. A zoom lens according to claim 1, wherein said aspherical lens is said third lens.

4. A zoom lens according to claim 1, satisfying the following condition:

$$0.25 < |f2/fA| < 0.41$$

where $$fA = \sqrt{fw \cdot ft}$$

wherein f2 is a focal length of said second lens unit, and fw and ft are focal lengths in the wide-angle end and the telephoto end of said zoom lens, respectively.

5. A zoom lens according to claim 1, satisfying the following conditions:

$$36 < \nu n < 65$$

$$20 < \nu p < 35$$

where $\nu n$ is a mean Abbe number of materials of negative lenses which constitute said second lens unit, and $\nu p$ is a mean Abbe number of materials of positive lenses which constitute said second lens unit.

6. A zoom lens according to claim 1, satisfying the following condition:

$$1.71 < Nn < 1.95$$

where Nn is a mean refractive index of materials of negative lenses which constitute said second lens unit.

7. A zoom lens according to claim 1, satisfying the following condition:

$$0.79 < |R22/f2| < 1.32$$

where R22 is a radius of curvature of the second lens surface, when counted from the object side, in said second lens unit, and f2 is a focal length of said second lens unit.

8. A zoom lens according to claim 1, satisfying the following condition:

$$0.98 < |R26/R27| < 3.55$$

where R26 and R27 are radii of curvature of the sixth and seventh lens surfaces, respectively, when counted from the object side, in said second lens unit.

9. A zoom lens comprising, in order from an object side to an image side,
- a first lens unit of positive optical power,
- a second lens unit of negative optical power, said second lens unit moving to the image side for zooming from the wide-angle end to the telephoto end,
- a third lens unit of positive optical power, and
- a fourth lens unit of positive optical power, said fourth lens unit moving during zooming,
wherein said third lens unit has, in order from the object side to the image side, a positive lens having an aspherical surface and a negative meniscus lens having a convex surface facing the object side, and
wherein said second lens unit has three negative lenses and one positive lens.

10. A zoom lens according to claim 9, satisfying the following condition:

$$0.24 < |f2/fA| < 0.33$$

where $$fA = \sqrt{fw \cdot ft}$$

wherein fw and ft are focal lengths at the wide-angle end and the telephoto end of the entire zoom lens, and f2 is the focal length of said second lens unit.

11. A zoom lens according to claim 9, satisfying the following condition:

$$0.86 < |f3/fA| < 1.09$$

where $$fA = \sqrt{fw \cdot ft}$$

wherein fw and ft are focal lengths at the wide-angle end and the telephoto end of the entire zoom lens, and f3 is a focal length of said third lens unit.

12. A zoom lens according to claim 9, wherein said fourth lens unit moves during focusing, and the following condition is satisfied:

$$0.40 < \beta 4T < 0.55$$

wherein $\beta 4T$ is the magnification at the telephoto end of said fourth lens unit with an object at infinity.

13. A zoom lens according to claim 9, satisfying the following conditions:

$$36 < \nu n < 65$$

$$20 < \nu p < 35$$

where $\nu n$ is the mean Abbe number of the materials of the negative lenses that constitute said second lens unit, and $\nu p$ is the mean Abbe number of the material of the positive lens which constitutes said second lens unit.

14. A zoom lens according to claim 9, satisfying the following condition:

$$70 < Nn < 1.95$$

where Nn is the mean refractive index of the materials of the negative lenses that constitute said second lens unit.

15. A zoom lens according to claim 9, wherein said second lens unit comprises, in order from an object side to an image side,
- a first negative lens having a concave surface of stronger optical power on the image side than on the object side,
- a second negative lens both surfaces of which are concave, a first positive lens having a convex surface of stronger optical power on the object side than on the image side, and a third negative lens, both surfaces of which are concave.

16. A zoom lens according to claim 15, satisfying the following condition:

$$0.82 < |R22/f2| < 1.07$$

where R22 is the radius of curvature of the second lens surface counted from the object side of said second lens unit and f2 is the focal length of said second lens unit.

17. A zoom lens according to claim 15, satisfying the following condition:

$$1.66 < |R24/R25| < 4.00$$

where R24 and R25 are the radii of curvature of the fourth lens surface and the fifth lens surface, respectively, counted from the object side, of said second lens unit.

18. A zoom lens according to claims 15, satisfying the following condition:

$$1.00 < |R26/R27| < 1.46$$

where R26 and R27 are the radii of curvature of the sixth lens surface and the seventh lens surface, respectively, counted from the object side, of said second lens unit.

19. A camera comprising:

a zoom lens according to claim 9; and an image pickup element, said image pickup element receiving an image formed by said zoom lens.

20. A zoom lens comprising, in order from an object side to an image side, a first lens unit of positive optical power, a second lens unit of negative optical power, said second lens unit moving during zooning, a third lens unit of positive optical power, and a fourth lens unit of positive optical power, said fourth lens unit moving during zooming, wherein said third lens unit has a positive lens, both surfaces of which are aspherical, and wherein said second lens unit has three negative lenses and one positive lens, said zoom lens satisfying the following condition:

$$0.86 < |f3/fA| < 1.09$$

where $$fA = \sqrt{fw \cdot ft}$$

wherein fw and ft are focal lengths at the wide-angle end and the telephoto end of the entire zoom lens, and f3 is a focal length of said third lens unit.

21. A zoom lens comprising, in order from an object side to an image side, a first lens unit of positive optical power, a second lens unit of negative optical power, said second lens unit moving during zooming, a third lens unit of positive optical power, and a fourth lens unit of positive optical power, said fourth lens unit moving during zooming, wherein said third lens unit has a positive lens, both surfaces of which are aspherical, wherein said second lens unit has three negative lenses and one positive lens, wherein said fourth lens unit moves during focusing, and wherein the following condition is satisfied:

$$0.40 < \beta 4T < 0.55$$

wherein β4T is the magnification at the telephoto end of said fourth lens unit with an object at infinity.

22. A zoom lens comprising, in order from an object side to an image side, a first lens unit of positive optical power, a second lens unit of negative optical power, said second lens unit moving during zooming, a third lens unit of positive optical power, and a fourth lens unit of positive optical power, said fourth lens unit moving during zooming, wherein said third lens unit has a positive lens, both surfaces of which are aspherical, wherein said second lens unit has three negative lenses and one positive lens, and wherein said second lens unit comprises, in order from an object side to an image side, (a) a first negative lens having a concave surface of stronger optical power on the image side than on the object side, (b) a second negative lens both surfaces of which are concave, (c) a first positive lens having a convex surface of stronger optical power on the object side than on the image side, and (d) a third negative lens, both surface of which are concave, said zoom lens satisfying the following condition:

$$1.66 < |R24/R25| < 4.00$$

where R24 and R25 are the radii of curvature of the fourth lens surface and the fifth lens surface, respectively, counted from the object side, of said second lens unit.

23. A zoom lens comprising, in order from an object side to an image side, a first lens unit of positive refractive power, a second lens unit of negative refractive power, a third lens unit of positive refractive power, and a fourth lens unit of positive refractive power, zooming from a wide-angle end to a telephoto end being effected by moving said second lens unit toward the image side, and shifting of an image plane due to zooming being compensated for by moving said fourth lens unit, wherein said second lens unit consists of four single lenses including three negative lenses and one positive lens, wherein for the third lens in order from the object side of said four single lenses, a surface of the object side is an aspherical surface, and wherein the following condition is satisfied:

$$0.25 < |f2/fA| < 0.41$$

where $$fA = \sqrt{fw \cdot ft}$$

wherein f2 is a focal length of said second lens unit, and fw and ft are focal lengths in the wide-angle end and the telephoto end of said zoom lens, respectively.

24. A zoom lens comprising, in order from an object side to an image side, a first lens unit of positive refractive power, a second lens unit of negative refractive power, a third lens unit of positive refractive power, and a fourth lens unit of positive refractive power, zooming from a wide-angle end to a telephoto end being effected by moving said second lens unit toward the image side, and shifting of an image plane due to zooming being compensated for by moving said fourth lens unit, wherein said second lens unit consists of four lenses including three negative lenses and one positive lens, and at least one of said four lenses is an aspherical lens, wherein the zoom lens satisfies the following condition:

$$0.25 < |f2/fA| < 0.41$$

where $$fA = \sqrt{fw \cdot ft}$$

wherein f2 is a focal length of said second lens unit, and fw and ft are focal lengths in the wide-angle end and the telephoto end of said zoom lens, respectively.

25. A camera comprising:

a zoom lens according to claim 1, and an image pickup element, said image pickup element receiving an image formed by said zoom lens.

26. A zoom lens comprising, in order from an object side to an image side, a first lens unit of positive optical power, a second lens unit of negative optical power, said second lens unit moving during zooming, a third lens unit of positive optical power, and a fourth lens unit of positive optical power, said fourth lens unit moving during zooming, wherein said third lens unit has, in order from the object side to the image side, a positive lens having an aspherical surface and a negative meniscus lens having a convex surface facing the object side, and wherein said second lens unit has three negative lenses and one positive lens, and wherein the following condition is satisfied:

$$0.24 < |f2/fA| < 0.33$$

where $$fA = \sqrt{fw \cdot ft}$$

wherein fw and ft are focal lengths at the wide-angle end and the telephoto end of the entire zoom lens, and f2 is the focal length of said second lens unit.

27. A zoom lens comprising, in order from an object side to an image side, a first lens unit of positive optical power, a second lens unit of negative optical power, said second lens unit comprising three negative lenses and one positive lens, and at least one of said three negative lenses and one positive lens being an aspherical lens, a third lens unit of positive optical power, said third lens unit comprising a positive lens with an aspherical surface, said positive lens being closest to the object side of any lens in said third lens unit, and a fourth lens unit of positive optical power, said fourth lens unit comprising a cemented lens, said cemented lens being made of a positive lens and a negative lens, the negative lens of said cemented lens being cemented with the image side of the positive lens of said cemented lens, wherein said second lens unit moves to the image side for zooming from the wide-angle end to the telephoto end, said third lens unit does not move for zooming, said first lens unit does not move for zooming, and said fourth lens unit moves for zooming.

28. A camera comprising:

a zoom lens according to claim 27, and an image pickup element, said image pickup element receiving an image formed by said zoom lens.

29. A zoom lens according to claim 27, wherein said positive lens of said third lens unit has two aspherical surfaces.

30. A zoom lens according to claim 27, wherein said first lens unit comprises a plurality of lenses.

31. A zoom lens according to claim 27, wherein during zooming from the wide-angle end to the telephoto end, said fourth lens unit moves toward the object side and thereafter toward the image side.

32. A zoom lens according to claim 27, wherein said third lens unit comprises a negative meniscus lens having a convex surface facing the object side.

33. A zoom lens according to claim 32, wherein said positive lens of said third lens unit has two aspherical surfaces, and wherein said first lens unit comprises a plurality of lenses.

* * * * *

UNITED STATES PATENT AND TRADEMARK OFFICE
CERTIFICATE OF CORRECTION

PATENT NO.    : 6,751,028 B1
DATED         : June 15, 2004
INVENTOR(S)   : Akihisa Horiuchi It is certified that error appears in the above-identified patent and that said Letters Patent is hereby corrected as shown below:

Column 1,
Line 27, "laid-Open" should read -- Laid-Open --.
Line 53, "increasing" should read -- increasing of --.

Column 2,
Line 43, "inorder" should read -- in order --.

Column 6,
Line 31, "surface a" should read -- surface --.

Column 12,
Line 17, "decrease" should read -- decreased --.

Column 15,
Line 50, "-5 251" should read -- -5.251 --.

Column 17,
Line 2, "R25" should read -- R25| --.
Line 13, "biconcave" should read -- bi-concave --.

Column 18,
Line 56, "70" should read -- 1.70 --.

Column 20,
Line 31, "both surface" should read -- both surfaces --.
Line 32, "said" should begin a new paragraph.

Signed and Sealed this

Fifteenth Day of March, 2005

JON W. DUDAS
*Director of the United States Patent and Trademark Office*